United States Patent [19]

Ohsuga et al.

[11] Patent Number: 5,117,795

[45] Date of Patent: Jun. 2, 1992

[54] AIR-FUEL MIXTURE SUPPLY APPARATUS FOR INTERNAL COMBUSTION ENGINE

[75] Inventors: Minoru Ohsuga; Toshiharu Nogi, both of Katsuta, Japan; Teruo Yamauchi, Farmington Hills, Mich.; Yoshishige Ohyama, Katsuta, Japan

[73] Assignee: Hitachi, Ltd., Tokyo, Japan

[21] Appl. No.: 530,192

[22] Filed: May 29, 1990

[30] Foreign Application Priority Data

May 29, 1989 [JP] Japan ................................. 1-132613

[51] Int. Cl.⁵ ............................................. F02M 51/00
[52] U.S. Cl. ..................................... 123/478; 123/494
[58] Field of Search ............... 123/494, 430, 478, 480; 73/118.2

[56] References Cited

U.S. PATENT DOCUMENTS

| | | | |
|---|---|---|---|
| 4,074,566 | 2/1978 | Obayashi et al. | 73/118.2 |
| 4,142,407 | 3/1979 | Kuroiwa et al. | 73/118.2 |
| 4,492,211 | 1/1985 | Shimomura et al. | 123/494 |
| 4,515,127 | 5/1985 | Katsuoka | 123/430 |
| 4,911,128 | 3/1990 | Hara et al. | 123/494 |
| 4,911,133 | 3/1990 | Sogawa | 123/494 |
| 4,924,837 | 5/1990 | Chujo et al. | 123/494 |
| 4,949,694 | 8/1990 | Nagaishi et al. | 123/494 |

FOREIGN PATENT DOCUMENTS

| | | |
|---|---|---|
| 0261473 | 3/1988 | European Pat. Off. . |
| 0314081 | 5/1989 | European Pat. Off. . |
| 2357469 | 5/1975 | Fed. Rep. of Germany ..... 73/118.2 |
| 2301693 | 2/1976 | France . |
| 61-55342 | 7/1986 | Japan . |

Primary Examiner—E. Rollins Cross
Assistant Examiner—Thomas N. Moulis
Attorney, Agent, or Firm—Antonelli, Terry, Stout & Kraus

[57] ABSTRACT

An air-fuel mixture supply apparatus for a internal combustion engine in which the quantity of air sucked into each cylinder is measured and fuel of the quantity proportional to the measured air quantity is supplied into the measured air flow to thereby control the concentration of the air-fuel mixture exactly.

12 Claims, 37 Drawing Sheets

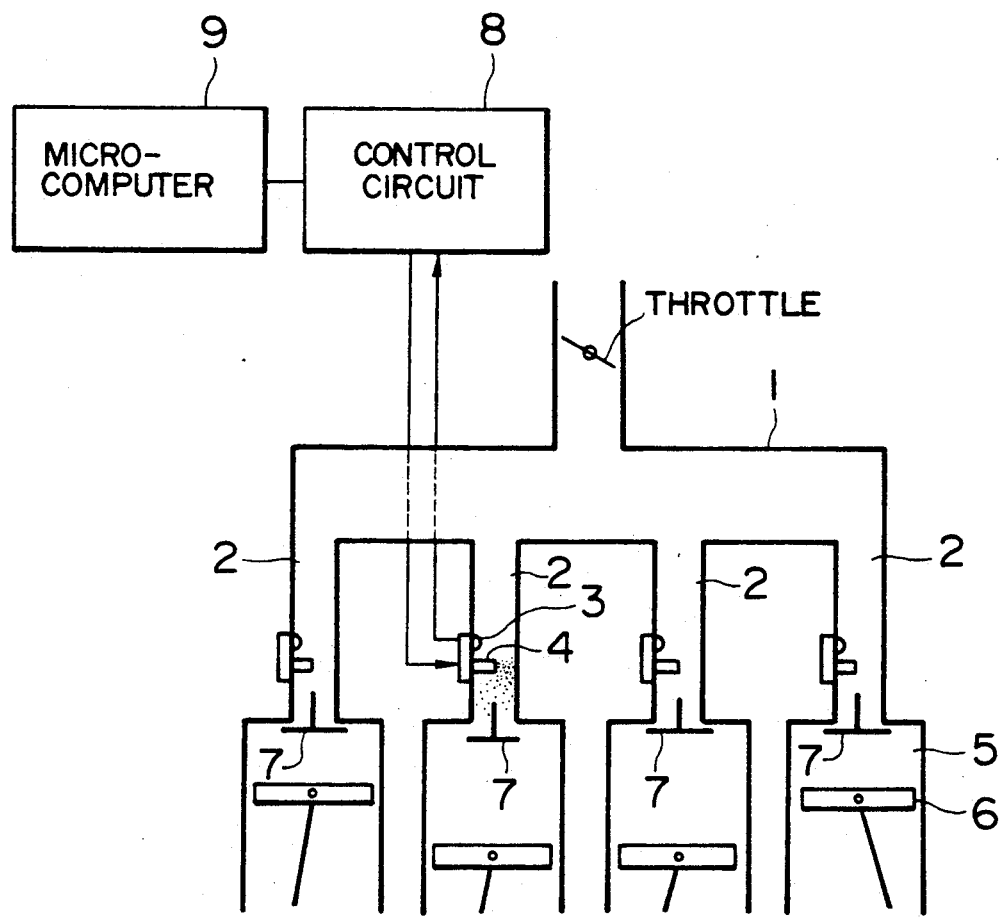

$F_1 > F_2 > F_3$ $W_{P1} > W_{P2} > W_{P3}$

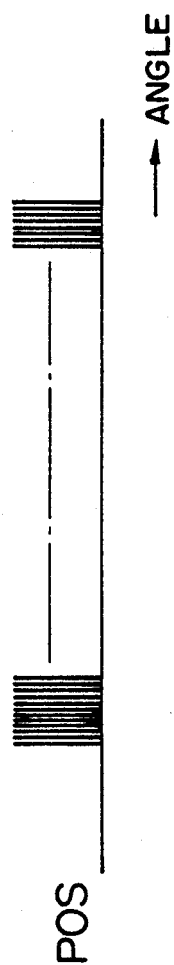
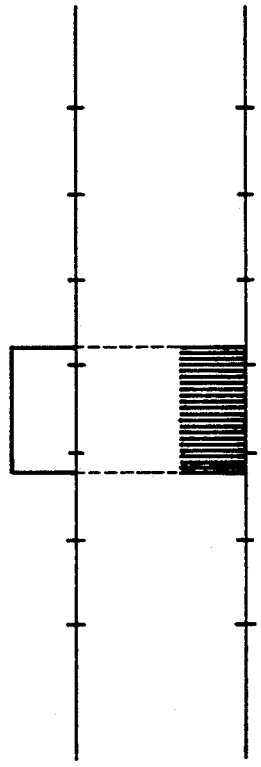
FIG. 31A  FIG. 31B  FIG. 31C  FIG. 31D  FIG. 31F  FIG. 31E

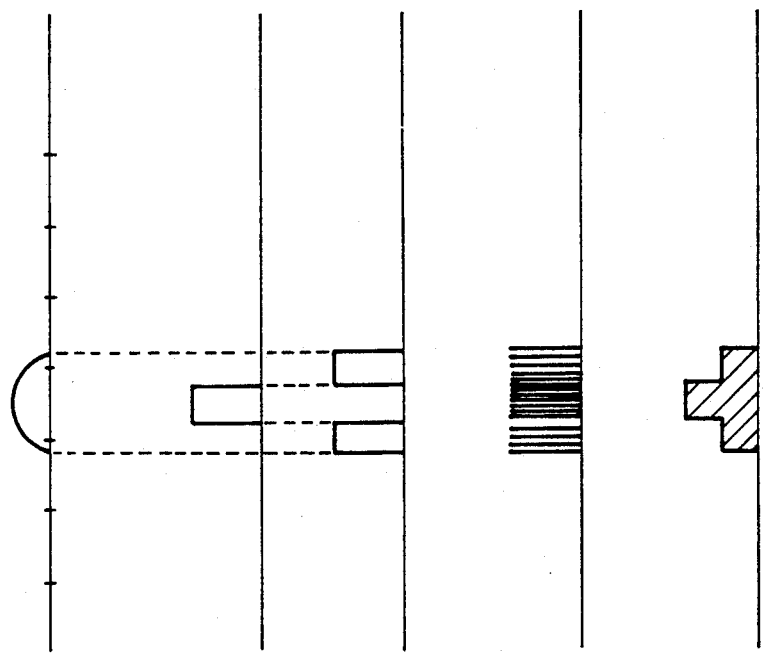

INTAKE AIR FLOW

→ ANGLE

AIR-FUEL MIXTURE SUPPLY APPARATUS FOR INTERNAL COMBUSTION ENGINE

BACKGROUND OF THE INVENTION

The present invention relates to an internal combustion engine air-fuel mixture supply apparatus for controlling air and fuel supplied to an internal combustion engine.

A so-called sequential injection system is employed in conventionally proposed fuel injection apparatuses. This system is well known as disclosed, for example, in Japanese Patent Unexamined Publication No. JP-A-63-314335.

The sequential injection system is arranged to inject fuel successively just before air-intake strokes of the respective cylinders.

In this case, the quantity of fuel to be injected is determined fundamentally corresponding to the output of an air flow meter provided in a downstream side of an air cleaner.

The air flow meter and each cylinder are connected to each other through an air-intake passage. Accordingly, the quantity of air sucked into each cylinder and the quantity of air metered by the air flow meter at the same point of time are different from each other.

In short, the output of the air flow meter merely exhibits the past air quantity.

Accordingly, the fuel quantity determined based on the output of the air flow meter at a certain point of time has no relation to the quantity of suction air taken into the cylinder at that certain point of time.

Accordingly, the concentration of the air-fuel mixture in the cylinder cannot be determined exactly. There arises a problem in that irregular combustion and fluctuations in rotation occur.

SUMMARY OF THE INVENTION

An object of the present invention is therefore to provide an apparatus in which the quantity of air sucked into each cylinder is detected and fuel is injected into the cylinder in an air-intake stroke in which the air is sucked into the cylinder so that the concentration of the air-fuel mixture in the cylinder can be controlled exactly.

In order to attain the above object, according to an aspect of the present invention, the air-fuel mixture supply apparatus for an internal combustion engine comprises:

a cylinder air quantity detection means for detecting air quantity at an inlet to at least one cylinder;

a control means for calculating a fuel quantity proportional to the output of the cylinder air quantity detection means and for generating a signal to supply fuel in an air-intake stroke of the cylinder; and a fuel injection means for injecting fuel in the air-intake stroke of the cylinder based on the signal of the control means.

BRIEF DESCRIPTION OF THE DRAWINGS

Other features and advantages of the present invention will be apparent from the following description taken in connection with the accompanying drawings, wherein:

FIG. 1 is a schematic diagram showing the whole configuration of an embodiment of the present invention;

FIG. 2 is a view for explaining the operation of the apparatus depicted in FIG. 1;

FIGS. 31A through 31F and 32A through 32G are time charts;

DETAILED DESCRIPTION OF THE PREFERRED EMBODIMENTS

An embodiment of the present invention will be described hereunder.

Figure 3A:
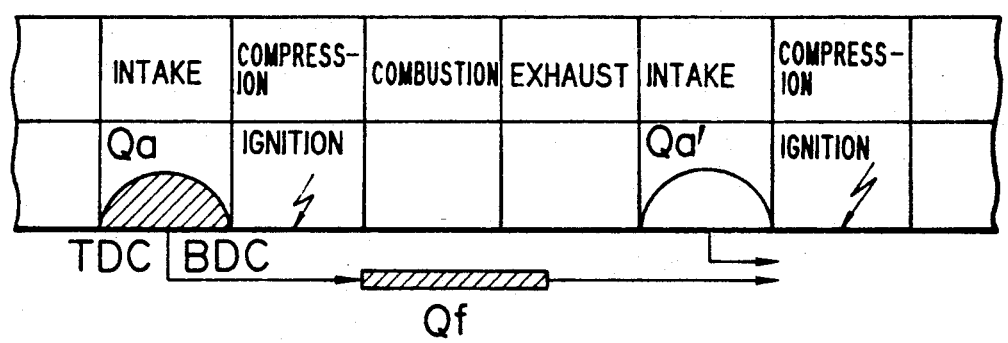
FIGS. 3A and 3B are views for explaining the air-intake stroke and the injection period.
Figure 3B:
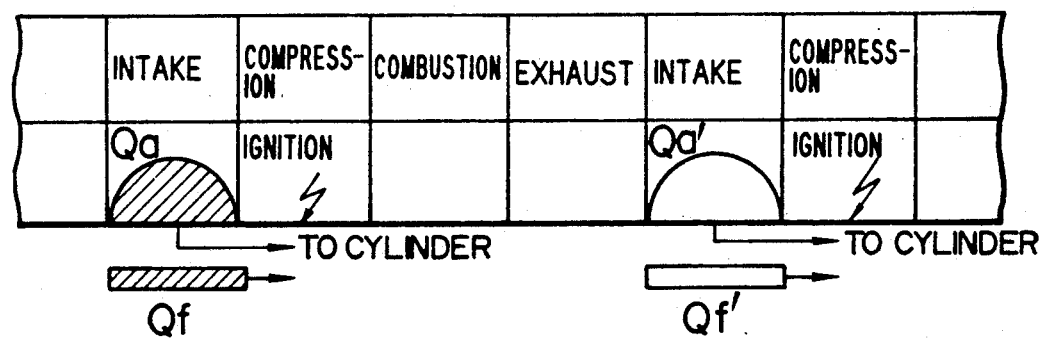

FIGS. 3A and 3B show the relationship between suction air and supply fuel in each cylinder. Specifically, FIG. 3A shows the case of conventional multiple fuel sequential injection. When an intake valve is opened, the suction air quantity $Q_a$ increases as the piston comes down. The suction air flow takes its maximum value in the middle of an air-intake stroke (from a top dead center, that is a TDC, to bottom dead center, that is BDC). Then, the suction air quantity decreases toward BDC. In a conventional apparatus, the air flow rate produced by the air intake is detected in a suction pipe collecting portion provided on the downstream side of the air cleaner; the fuel quantity $Q_f$ corresponding to the detected air flow rate is determined by a microcomputer; and the fuel of the determined quantity is injected into an air-intake port portion just before a next air-intake stroke ($Q_a'$) of the cylinder. In the aforementioned conventional system, the supplied fuel quantity $Q_f$ cannot correspond to the suction air quantity $Q_a'$ actually taken into the cylinder. That is, the microcomputer determines $Q_f$ to make the air-fuel ratio $Q_a/Q_f$ constant. However, the air-fuel ratio of the air-fuel mixture actually taken in the cylinder is $Q_a'/Q_f$ which is different from the value determined by the microcomputer. In short, the relation $Q_a/Q_f \neq Q_a'/Q_f$ is established because the supplied fuel quantity is delayed by one cycle.

On the other hand, FIG. 3B shows the case of the present invention. In this case, upon generation of suction air, while the suction air quantity $Q_a$ is detected, a real-time supply of fuel of the quantity $Q_f$ is provided corresponding to the detected value of the suction air quantity $Q_a$. In short, fuel of the quantity corresponding to the suction air quantity is supplied simultaneously with the detection of the suction air quantity $Q_a$. According to the present invention, the air-fuel ratio of the air-fuel mixture taken in the cylinder is always kept substantially constant. In this case, the relation $Q_a/Q_f = Q_a'/Q_f' =$ (constant) is established, so that the fluctuation of the mixture rate in the cylinder at every cycle is eliminated. Because fuel is supplied simultaneously with the metering of air, the delay of fuel supply by one cycle as shown in FIG. 3A is prevented.

Figure 4A:
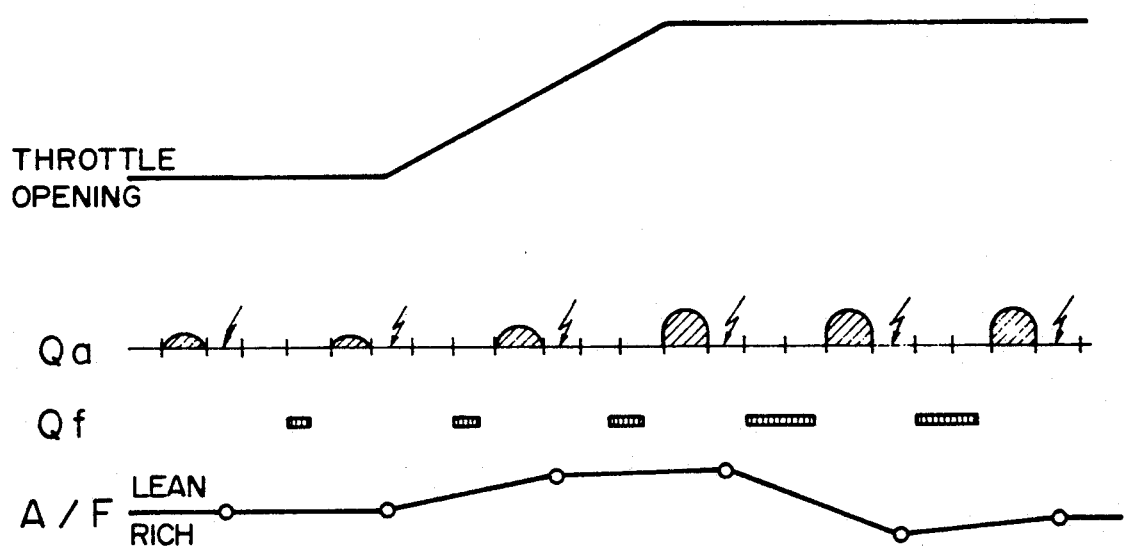
FIGS. 4A and 4B are views showing characteristics at the time of acceleration.
Figure 4B:
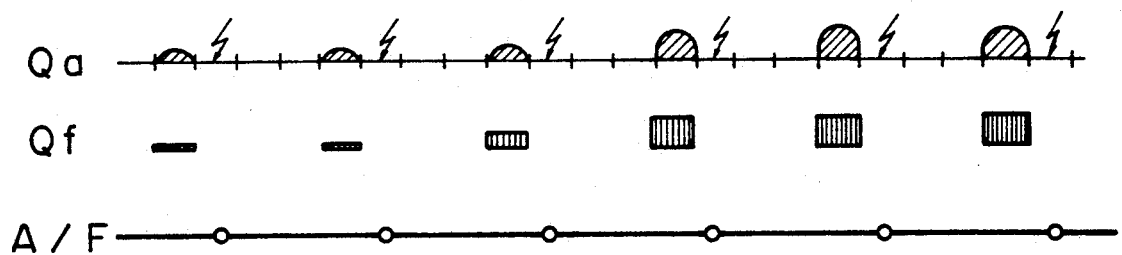

FIGS. 4A and 4B show the suction air quantity $Q_a$ in one cylinder, the quantity $Q_f$ of fuel and the air-fuel ratio A/F of an air-fuel mixture in the cylinder when the accelerator pedal is depressed. FIG. 4A shows the characteristics in the conventional apparatus. In general, as the accelerator pedal is depressed, the suction air quantity increases. In the conventional apparatus, the supplied fuel quantity is delayed by one cycle as shown in FIG. 3A so that the A/F in the cylinder is out of the constant value in the way of change of the suction air quantity $Q_a$.

The diagram of FIG. 4B shows a characteristic of the apparatus according to the present invention. According to the present invention, fuel proportional to suction air is supplied simultaneously with the metering of suction air. Accordingly, the delay in fuel supply by one cycle is eliminated so that the A/F in the cylinder is always kept constant.

In other words, in the case of the diagram of FIG. 4A, the A/F in the cylinder first becomes lean when the accelerator pedal is depressed, and then becomes more or less rich so as to be converged into a constant value. Because the A/F becomes lean temporally at the time of acceleration, torque is lowered temporally so that breathing and surge occurs.

On the other hand, according to the present invention, the A/F in the cylinder can be always kept constant even at the time of acceleration, so that torque is not lowered and no breathing and no surge are caused.

FIG. 1 shows an embodiment of the present invention based on the aforementioned concept. In this embodiment, individual-cylinder air flow sensors 3 for detecting the air quantities sucked into respective cylinders 5 and fuel supply units 4 for supplying fuel into the respective cylinders 5 are provided in respective air-intake ports 2 of a suction pipe 1. When an intake valve 7 is opened so that the piston 6 comes down in one of the cylinders, air flow occurs in the corresponding air-intake port 2. The quantity of the flowing suction air is detected by the corresponding individual-cylinder air flow sensor 3. Simultaneously with the detection of the suction air quantity, the corresponding fuel supply unit 4 constituted by an injection valve is caused to supply fuel under control of a control circuit 8. The control circuit 8 is connected to a microcomputer 9 to perform various kinds of correcting operations which will be described later.

FIG. 2 show the relation between fuel and ignition in each cylinder in a 4-cylindered 4-cycle engine as shown in FIG. 1. First, suction air is produced in the cylinder No. 1. The suction air quantity is detected by the individual-cylinder air quantity sensor 3 provided in the air-intake port 2 of the cylinder No. 1. Simultaneously with the detection of the suction air quantity, fuel $Q_f$ is supplied through the injection valve 4 of the cylinder No. 1. Then, ignition of the air-fuel mixture is carried out by an ignition plug. Next, suction air is produced in the cylinder No. 3. The suction air quantity is detected by the individual-cylinder air flow sensor 3 provided in the air-intake port 2 of the cylinder No. 3. Simultaneously with the detection of the suction air quantity, fuel is supplied through the injection valve 4 provided in the air-intake port of the cylinder No. 3. Thereafter, suction air is produced successively in the cylinders No. 4, No. 2 and No. 1. Thus, the aforementioned operation is repeated.

Figure 5:
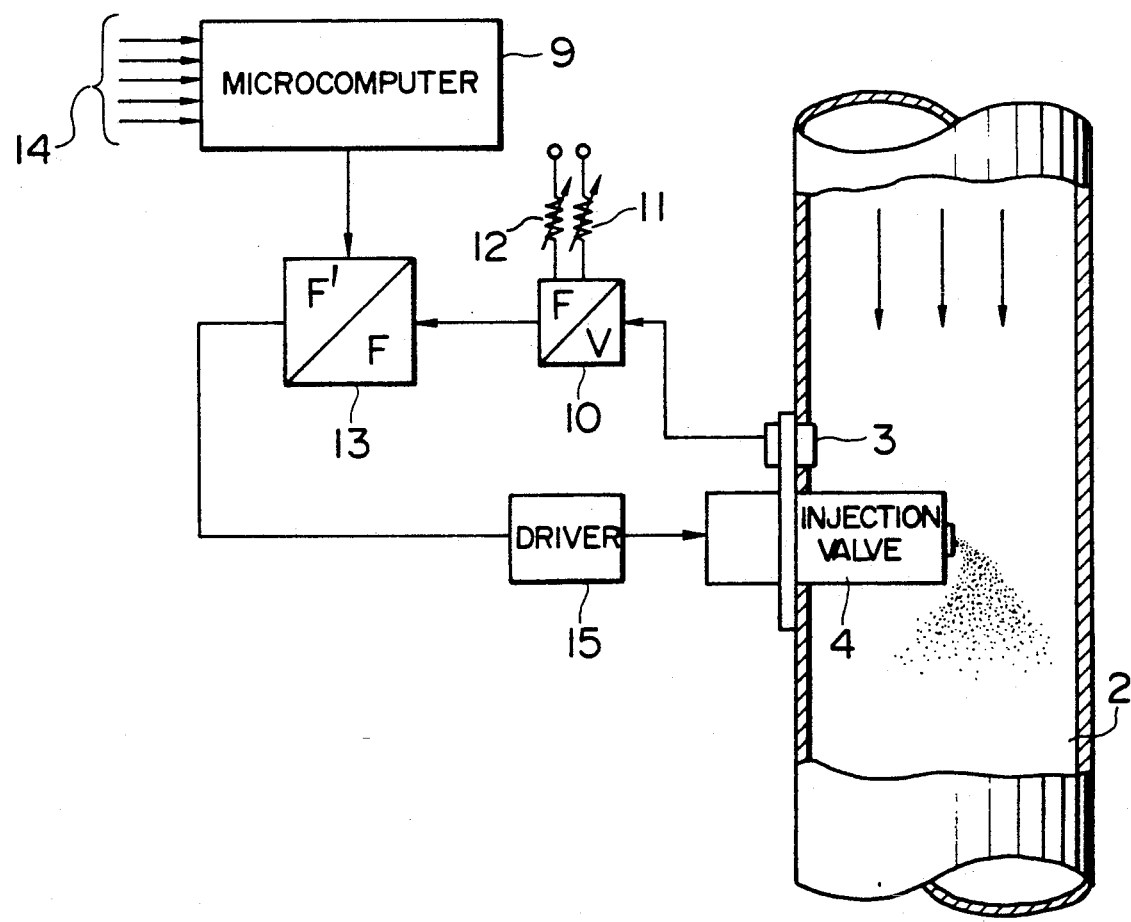
FIG. 5 is a diagram showing a specific example of the configuration of the apparatus depicted in FIG. 1.
Figure 6A:
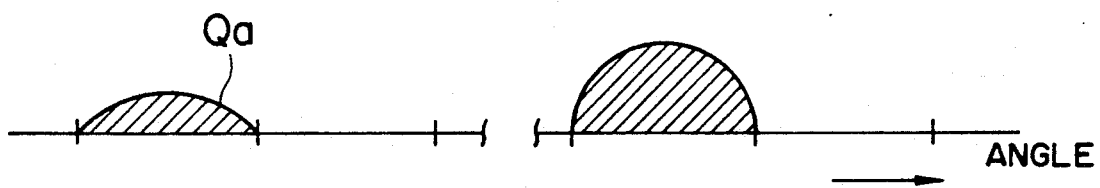
FIGS. 6A, 6B, 6C and 6D are views showing the relationship between the air-intake stroke and the fuel quantity.
Figure 6B:
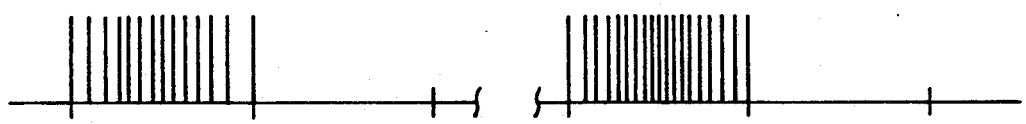
Figure 6C:
Figure 6D:
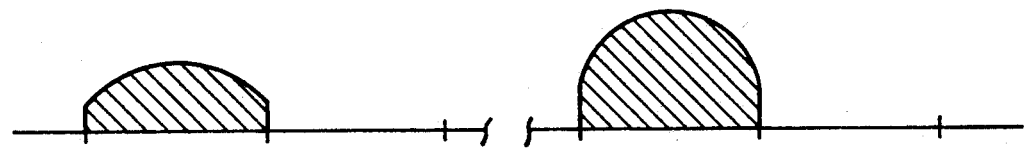

FIG. 5 shows an example of the inside of the control circuit 8. This example shows the case where the individual-cylinder air flow sensor 3 provided in each air-intake port 2 produces an analog output. The analog output of the individual-cylinder air flow sensor 3 is voltage-to-frequency (V/F) converted by a conversion circuit 10. That is, an ON-OFF signal having a frequency proportional to the analog output voltage is output from the conversion circuit 10. Variable resistors 11 and 12 serve to adjust a zero point and a span value. The thus frequency-converted signal F is supplied to a modulation circuit 13. In the modulation circuit 13, the frequency of the signal F is modulated from F to F' based on a signal given from the microcomputer 9. The modulation is carried out in order to correct the fuel quantity based on various kinds of parameters 14 which are applied to the microcomputer 9. The "various kinds of parameters" for correction include, for example, cooling water temperature, suction air temperature, battery voltage, desired air-fuel ratio, air-fuel ratio feedback, etc. The correction based on such various kinds of parameters may be carried out slowly within a range of several cycles. In short, there is no necessity of carrying out the correction in one air-intake stroke. Accordingly the microcomputer 9 is not used exclusively for this purpose. The frequency signal F' thus modulated is supplied to a drive circuit 15 of the injection valve 4. Fuel of the quantity proportional to the frequency F' is supplied into the air-intake port 2 through the drive circuit 15 and the injection valve 4.

In the case where the output signal of each individual-cylinder air quantity sensor 3 per se is a frequency signal, the V/F conversion circuit is not necessary and the output signal is supplied directly into the modulation circuit 13.

FIG. 6 shows flow charts of the operation of the circuit depicted in FIG. 5. In FIG. 6A, the diagram (a) shows the suction air quantity $Q_a$. Each individual-cylinder air quantity sensor 3 generates an analog output (not shown) proportional to the suction air quantity. The analog output is frequency-converted by the conversion circuit 10. The thus converted frequency signal is shown in the diagram of FIG. 6B. The suction air quantity $Q_a$ changes even in one air-intake stroke. The frequency signal shown in the diagram of FIG. 6B is subjected to the conversion corresponding to the change of the suction air quantity. In short, the frequency of the signal shown in the diagram of FIG. 6B is made low when the suction air quantity is small, that is, in the vicinity of TDC and in the vicinity of BDC. On the contrary, when the suction air quantity is large, that is, in the vicinity of the middle of the air-intake stroke, the frequency of the signal is made high. In short, because the suction air quantity changes in one air-intake stroke, the frequency of the signal shown in the diagram of FIG. 6B is changed corresponding to the change of the suction air quantity. The diagram of FIG. 6C shows a signal obtained by modulating the frequency signal of the diagram of FIG. 6B. The signal shown in the diagram of FIG. 6C is a signal represented by the symbol F' in FIG. 5. The signal shown in the diagram of FIG. 6C is supplied to the drive circuit 15. Because fuel of the quantity proportional to the frequency shown in the diagram of FIG. 6C is injected from the injection valve 4, the supplied fuel quantity changes corresponding to the suction air quantity in one air-intake stroke as shown in the diagram of FIG. 6D.

By the aforementioned method, fuel of the quantity corresponding to the suction air quantity can be supplied simultaneously with suction of air. Because fuel is supplied while the suction air quantity is metered, the concentration of the air-fuel mixture in the cylinder in every cycle is kept constant to prevent fluctuations of the output torque in the engine. Further, because the air-fuel mixture rate in the cylinder is kept constant even in accelerating operation as described above, the fluctuation of the torque can be eliminated so that there is no occurrence of breathing and surge. Further, because the fuel quantity changes proportionally to the change of the suction air quantity as shown in FIG. 6, the mixture rate of the air-fuel mixture taken in the cylinder is always kept constant with respect to crank angle in the air-intake stroke. Accordingly, the air-fuel mixture distribution in the cylinder is uniformalized to thereby stabilize combustion. Consequently, the engine is improved in stability, so that stable running can be made with no fluctuation of the torque even in idle running or the like.

Figure 7:
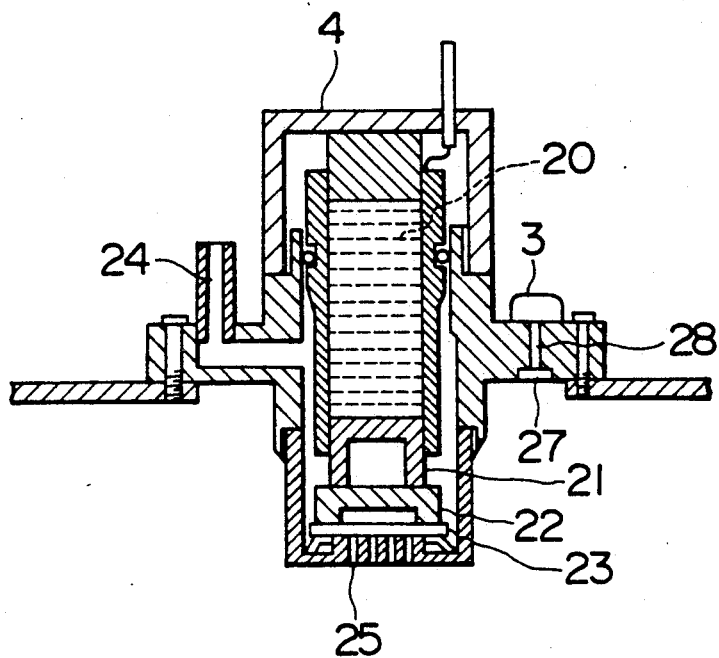
FIG. 7 is a view showing an example of the construction of the injection valve.

FIG. 7 shows an embodiment of the injection valve 4. In FIG. 7 the reference numeral 20 designates an electrostrictor for inducing distortion corresponding to the quantity of electricity applied to the electrostrictor. In short, the electrostrictor 20 is expanded and contracted corresponding to the frequency signal F'. The distortion in the form of vibration is transmitted to a disc 23 through rods 21 and 22. The disc 23 moves vertically corresponding to the frequency of the frequency signal. Fuel supplied from a passage 24 is injected through injection holes 25 corresponding to the vertical motion of the disc 23. In short, fuel is injected through the injection holes 25 while the frequency signal is being applied to the electrostrictor 20.

The pressure sensor 3 serving as each individual-cylinder air quantity sensor 3 is arranged so that the pressure of the air-intake port is led to a sensor portion through a pressure-receiving hole 27 and a passage 28. The pressure sensor 3 is provided integrally with a flange portion of the injection valve 4.

Figure 8:
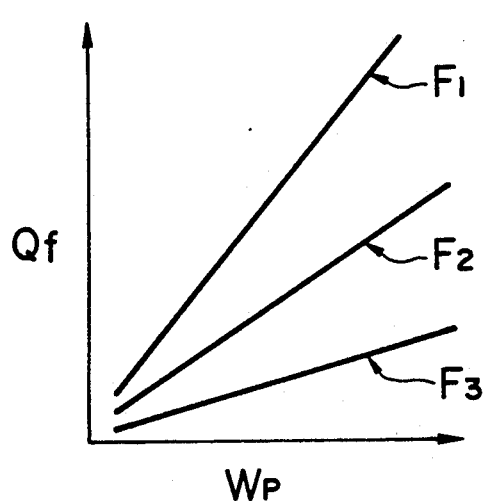
FIGS. 8 through 11 are characteristic graphs of the present invention.
Figure 9:
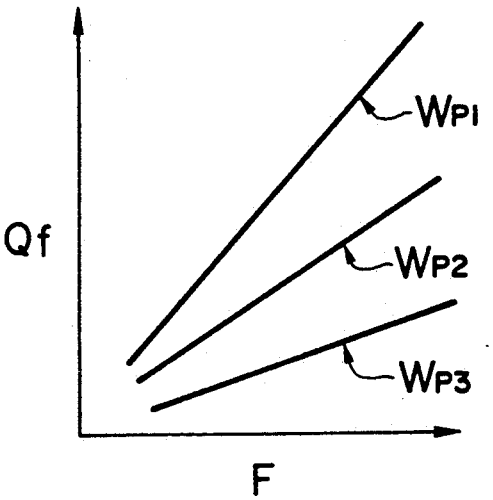

FIG. 8 shows the flow rate characteristic of the fuel quantity $Q_f$. In FIG. 8, $W_p$ represents a period in which the frequency signal is being applied to the electrostrictor 20, that is, the period corresponds to a period of one air-intake stroke in this embodiment. In FIG. 8, the parameters $F_1$, $F_2$ and $F_3$ respectively represent frequencies of signals applied to the electrostrictor. In the case where F is constant, $Q_f$ increases as $W_p$ increases. FIG. 9 shows another characteristic, in which under the condition that $W_p$ is constant, $Q_f$ increases as the frequency F increases.

Figure 10:
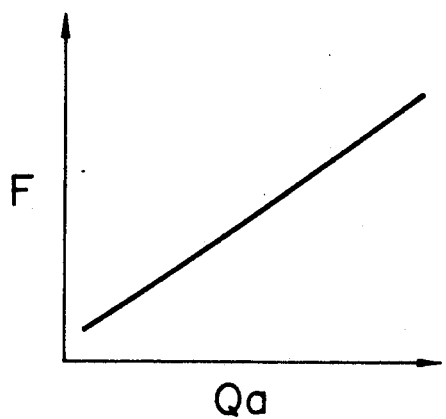

FIG. 10 shows the characteristic of the individual-cylinder air quantity sensor 3. Because the analog output increases as the air quantity $Q_a$ increases, the frequency F after V/F conversion increases. The relationship between $W_p$ and the engine speed N is as follows.

$$N \propto \frac{1}{W_p}$$

Figure 11:
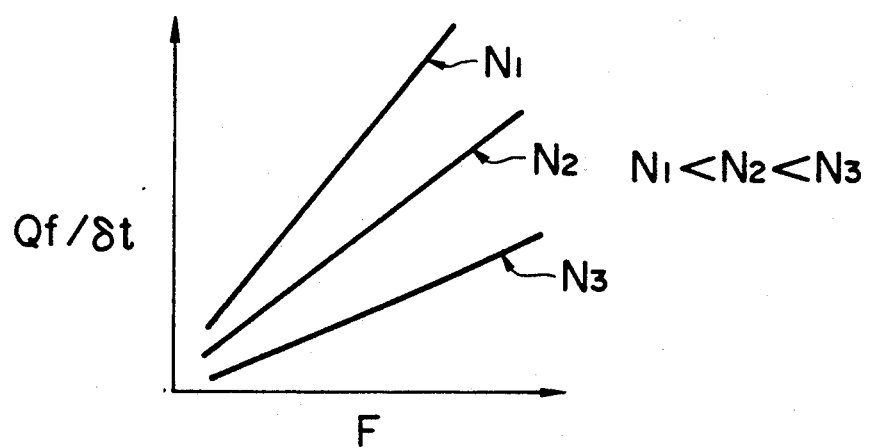

Accordingly, in the case where the engine speed N is used as a parameter, the flow rate characteristic of the injection valve 4 is as shown in FIG. 11. In FIG. 11, the ordinate represents the fuel quantity per air-intake stoke, that is, $Q_f/\delta_t$. In the case where the engine speed N is constant, $Q_f/\delta_t$ increases as the frequency F increases. In the case where the frequency F is constant, $Q_f/\delta_t$ decreases as the engine speed N increases. Because the frequency F is proportional to the suction air quantity $Q_a$ and because $Q_f/\delta_t$ is proportional to the frequency F, the mixture rate of the air-fuel mixture can be always kept constant.

Figure 12:
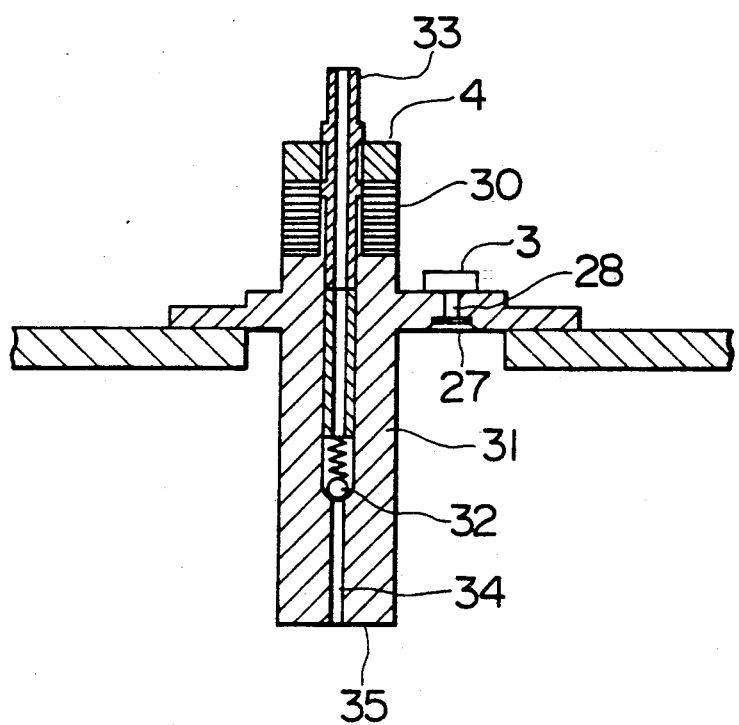
FIG. 12 is a view showing another example of the construction of the injection valve.

FIG. 12 shows another example of the configuration of the injection valve 4. Also in the injection valve 4 shown in FIG. 12, the fuel quantity $Q_f$ is changed based on the frequency signal. When the frequency signal is applied to an electrostrictor 30, a horn 31 vibrates. A ball 32 moves vertically with the vibration of the horn 31, so that fuel supplied from a passage 33 is injected through an injection hole 34. When the fuel is injected, the fuel is decomposed into finer particles through an end surface 35 by the vibration of the horn 31. Accordingly, the particle size of fuel injected becomes not more than 40 $\mu$m. In this example, the individual-cylinder air quantity sensor 3 is attached on a flange portion integrally therewith.

Figure 13:
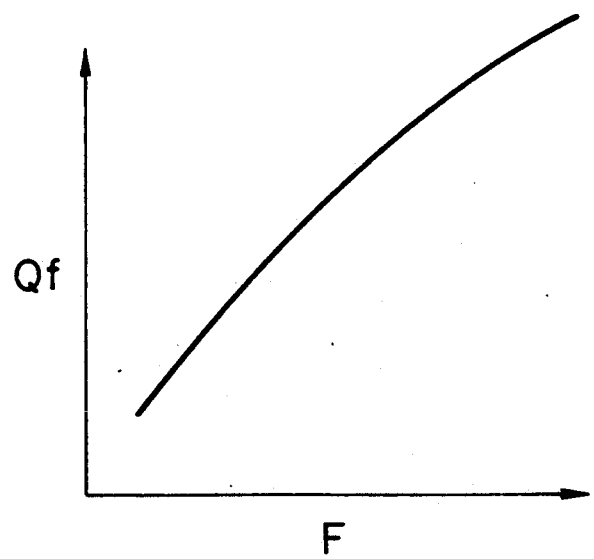
FIG. 13 is a graph showing the frequency-fuel characteristic.

FIG. 13 shows the characteristic of the fuel quantity $Q_f$. Also in this case, similarly to the foregoing injection valve, $Q_f$ increases proportionally to the frequency F.

Figure 14:
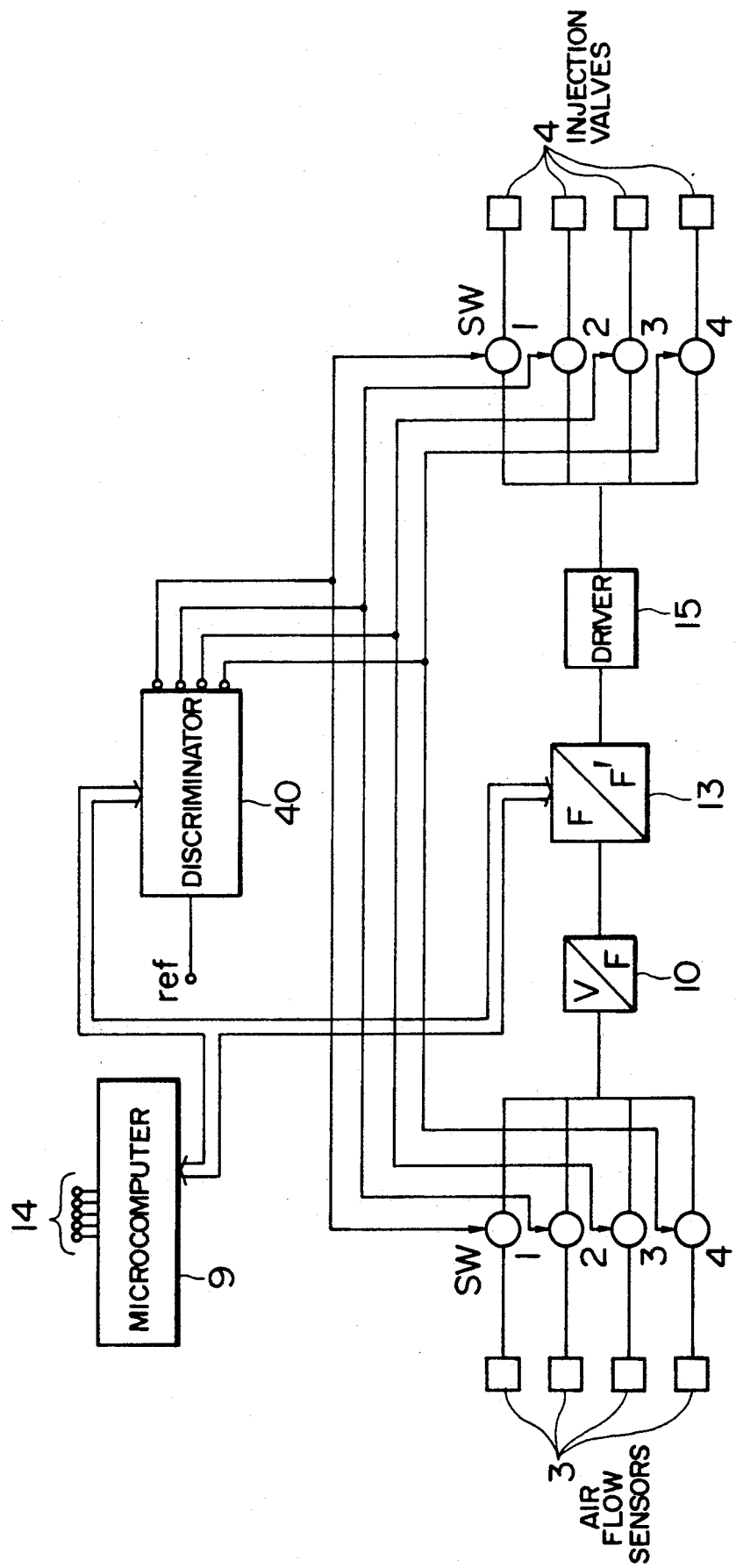
FIG. 14 is a diagram of an individual cylinder control circuit.

FIG. 14 shows a specific example of the configuration of the control circuit 8.

In FIG. 14, the reference numeral 40 designates a discrimination switching circuit for discriminating the cylinder to change-over switches SW1 to SW4. The reference numeral 3 designates individual-cylinder air flow sensors provided in cylinders respectively. The reference numeral 10 designates a V/F conversion circuit, 13 a frequency modulation circuit, 15 a drive circuit and 4 injection valves respectively provided in the cylinders. To make the V/F conversion circuit 10, the frequency modulation circuit 13 and the drive circuit 15 be used commonly by the individual-cylinder air flow sensors 3 and the injection valves 4, the switches SW1 to SW4 are provided. As described above, correction of the fuel quantity is carried out by the modulation circuit 13 based on various kinds of parameters 14 inputted into the microcomputer 9.

The cylinder number is discriminated by the discrimination switching circuit 40 based on a reference signal "ref" to thereby turn ON and OFF the switches SW1 to SW4. In the case where, for example, the cylinder No. 1 is selected, only the switch No. 1 is turned ON and the switches SW2 to SW4 except SW1 are turned OFF. The operation as described above with reference to FIG. 5 is carried out corresponding to the respective cylinders.

Figure 15:
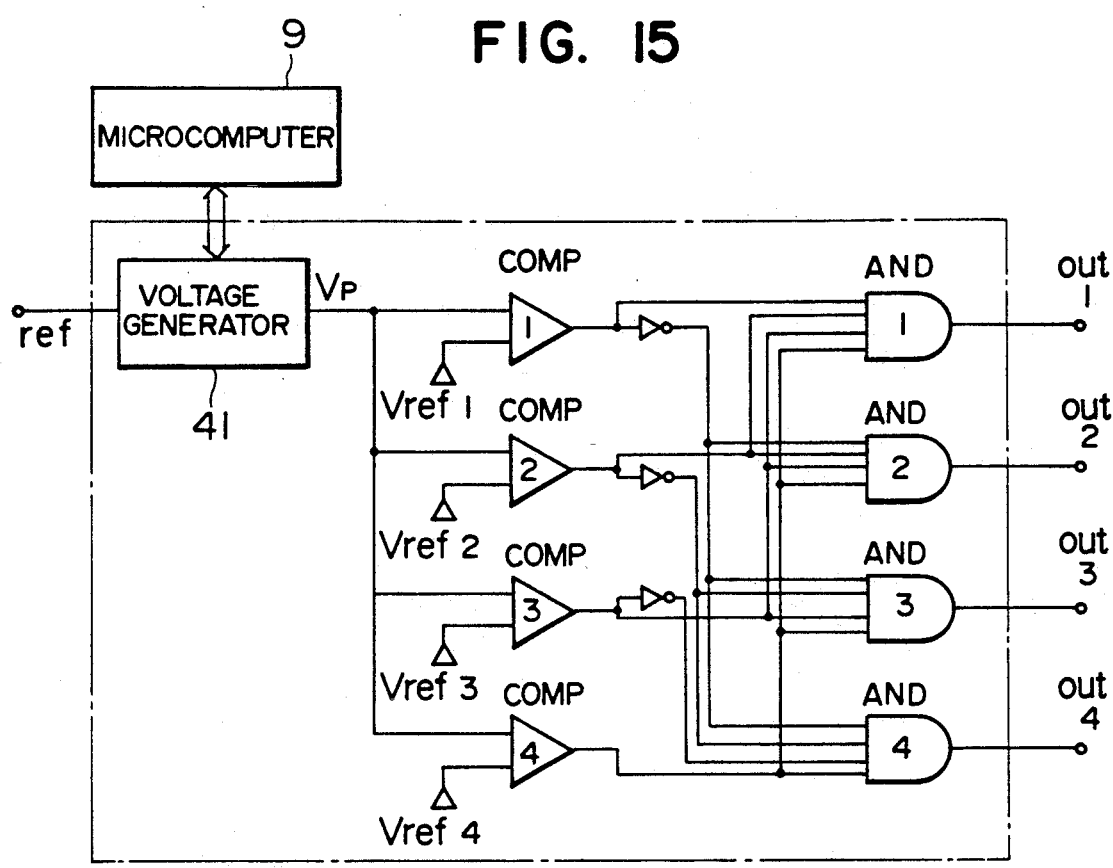
FIG. 15 is a diagram showing a specific example of the circuit depicted in FIG. 14.
Figure 16:
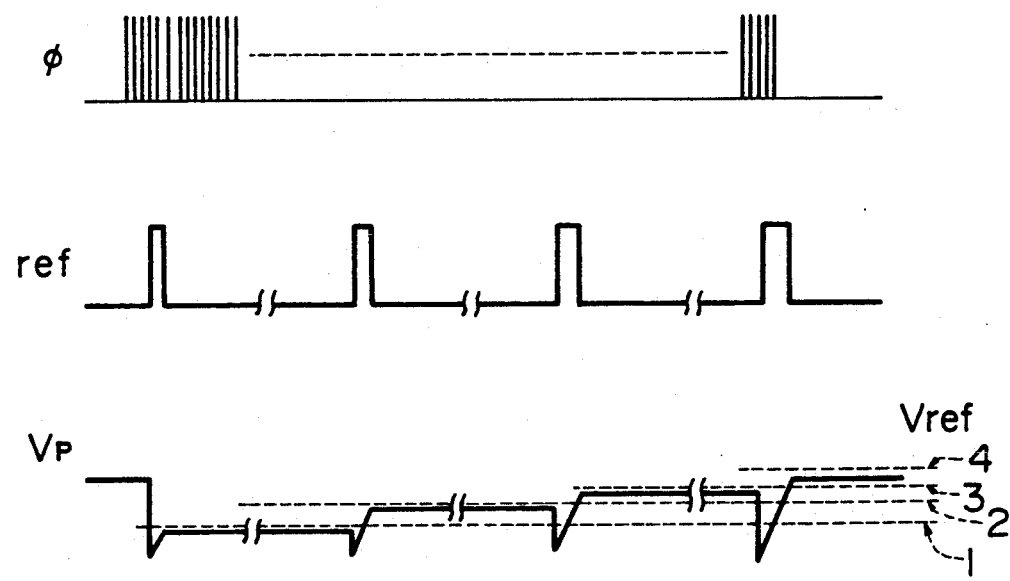
FIG. 16 is a time chart.

FIG. 15 shows a specific example of the configuration of the discrimination switching circuit 40. The reference signal "ref" is a signal having a pulse width which varies so as to be different for every cylinder to make it possible to discriminate the cylinders as shown in FIG. 16. In a voltage generation circuit 41, a voltage value $V_p$ corresponding to the pulse width of the signal "ref" is generated. By comparators COMP.1 to COMP.4, the voltage value $V_p$ is compared with reference values $V_{ref1}$ to $V_{ref4}$ provided for the purpose of discrimination of the respective cylinders. Based on the comparison, signals are issued to the switches SW1 to SW4 through AND circuits AND1 to AND4. When, for example, VP is a voltage corresponding to the cylinder No. 1, all of the comparators COMP.1 to COMP.4 produce Hi (high) signals. As a result, only the AND circuit AND1 produces a Hi signal. Accordingly, only an output signal "out"1 becomes Hi, so that only the switch SW1 is turned ON. When, for example, $V_p$ corresponds to the cylinder No. 2, only an output signal "out"2 becomes Hi.

FIG. 16 shows the operation of the circuit depicted in FIG. 15.

In FIG. 16, $\phi$ represents a clock pulse signal of the microcomputer, which has a frequency of the order of MHz. The reference signal "ref" in which pulses are generated at intervals of 180°, the pulses having pulse widths corresponding to the respective cylinders. By counting the pulse width based on the clock $\phi$ of the microcomputer, $V_p$ is increased. Accordingly, $V_p$ decreases as the pulse width decreases. On the contrary, $V_p$ increases as the pulse width increases. In short, $V_p$ is proportional to the pulse width. The value of $V_p$ is compared with reference voltages $V_{ref1}$ to $V_{ref4}$ in the respective comparators COMP.1 to COMP.4 so as to discriminate the cylinders.

The states of the respective comparators COMP.1 to COMP.4 are shown in Table 1.

TABLE 1

| | COMPARATOR | | | |
| --- | --- | --- | --- | --- |
| | 1 | 2 | 3 | 4 |
| out1 | ON | ON | ON | ON |
| out2 | OFF | ON | ON | ON |
| out3 | OFF | OFF | ON | ON |
| out4 | OFF | OFF | OFF | ON |

When, for example, all of the output signals of the comparators COMP.1 to COMP.4 are turned ON (Hi), only the AND circuit AND1 is turned ON (Hi). Accordingly, only the output signal "out"1 is turned ON. When, for example, $V_p$ is increased to a value between $V_{ref1}$ and $V_{ref2}$, the comparators COMP.2 to COMP.4 except the comparator COMP.1 are turned ON. Accordingly, only the AND circuit AND2 is turned ON, so that only the output signal "out"2 is turned ON. Similarly, the output signals "out"3 and "out"4 are successively turned ON corresponding to the respective cylinders. When the output signals "out"1 to "out"4 are successively turned ON, the switches are turned ON so that the individual-cylinder air quantity sensors 3 and the injection valves 4 are successively connected corresponding to the cylinders.

Figure 17:
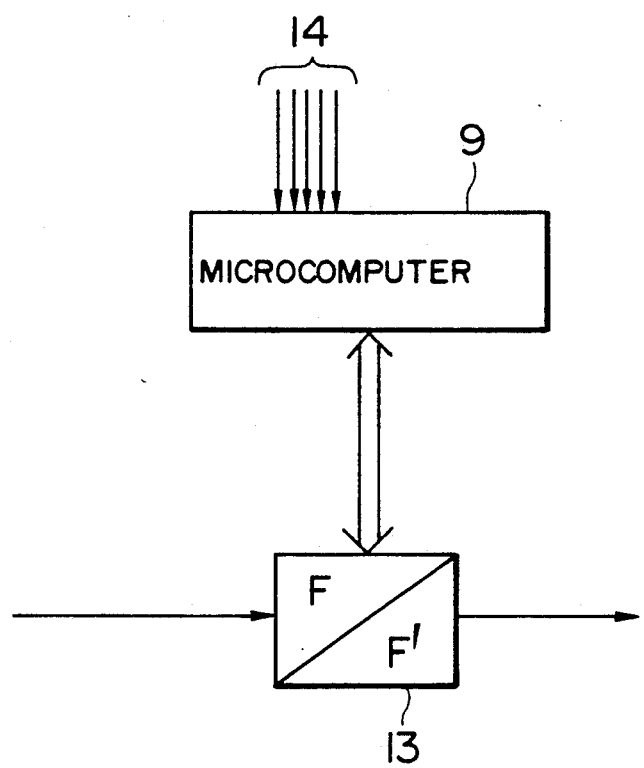
FIG. 17 is a diagram of a modulation circuit.

FIGS. 17 and 18 show the configuration and operation of the modulation circuit 13. FIG. 17 shows an example of the configuration of the modulation circuit 13. Correction parameters 14 are supplied to the microcomputer 9 so that a correction value is calculated based on these values of the parameters and modulated by the modulation circuit 13.

Figure 18A:
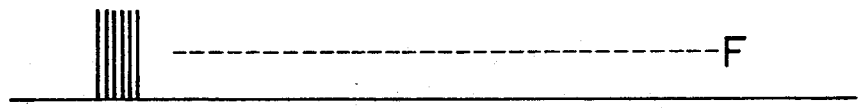
FIGS. 18A, 18B, 18C and 18D are time charts.
Figure 18B:
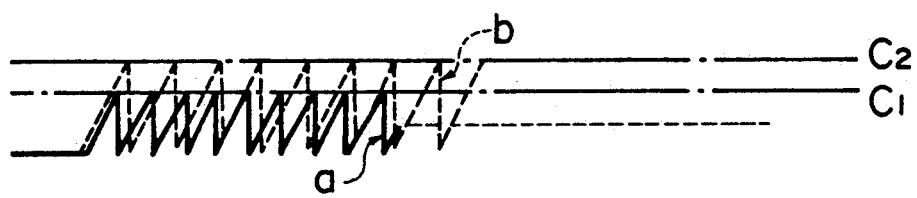
Figure 18C:
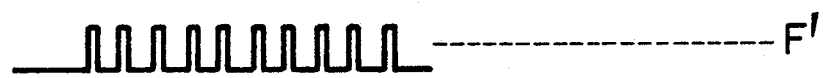
Figure 18D:

In FIG. 18, a counter performs counting up as shown in the diagram of FIG. 18B based on the frequency signal F shown in the diagram of FIG. 18A. The count-up value is compared with a value $C_1$ corresponding to the correction value. When the count-up value is larger than $C_1$, the count value is reset, and, at the same time, pulses having a predetermined pulse width are generated as shown in the diagram of FIG. 18C. The frequency of the pulse signal takes a modulated value F'. In the case where the correction value is changed, the reference value takes a value $C_2$, so that the modulated signal takes a frequency value F" as shown in the diagram of FIG. 18D.

As described above, the frequency signal is modulated based on the correction value. For example, the modulation circuit 13 may be constituted by a universal pulse processor.

Figure 19:
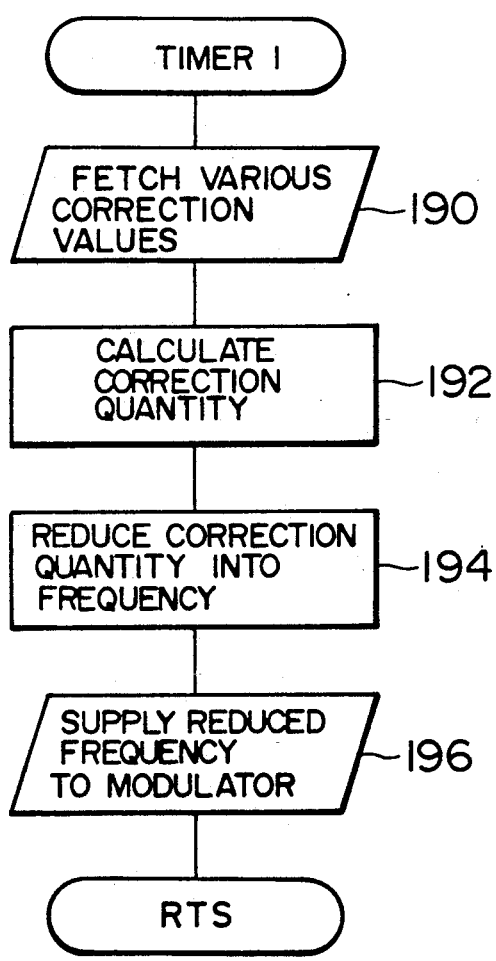
FIGS. 19 through 21 are flow charts.

FIG. 19 shows a flow chart of the microcomputer in the case where the fuel quantity is corrected. The flow chart is started by a timer 1. First, various kinds of correction values 14 are read in Step 190. Next, the quantity of correction is calculated based on the values in Step 192. Next, the quantity of correction is reduced into the frequency signal in Step 194 and then supplied to the modulation circuit in Step 196, for example, in the form of a signal $C_1$ or $C_2$ as shown in the diagram of FIG. 18B. There is no necessity of carrying out the flow chart at every air-intake stroke. This is because the changes of the cooling water temperature, the suction air temperature, the battery voltage and the like are slow. The real-time property of the timer 1 is not required as long as the timer 1 can be operated at intervals of a period within a range of from 100 ms to 140 ms.

Figure 20:
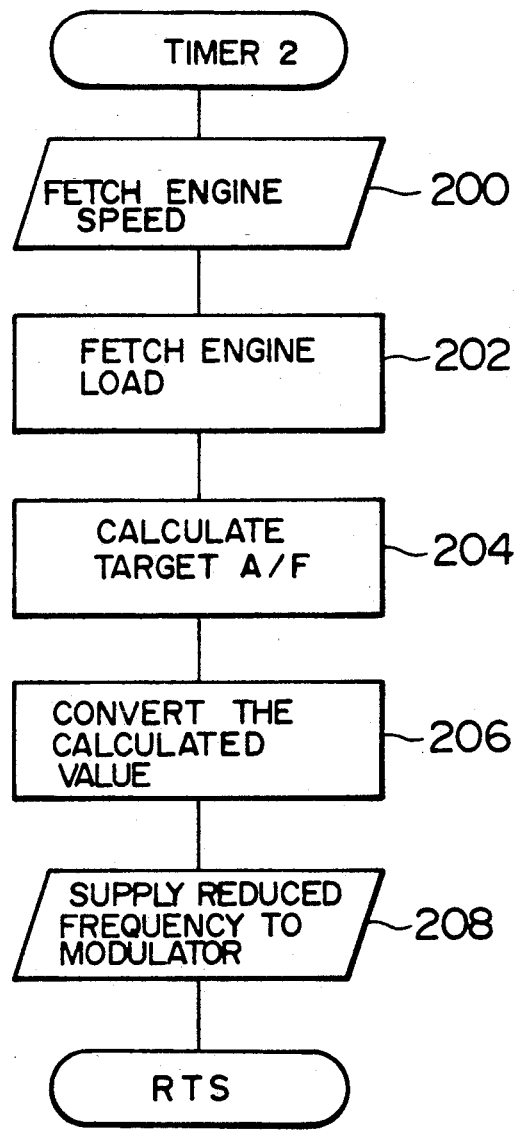

FIG. 20 shows the condition of modulation based on a desired air-fuel ratio $(A/F)_{ref}$. Because $(A/F)_{ref}$ is programmed On a map by reference to the engine speed N and the engine load, these values are read first in Steps 200 and 202 to find $(A/F)_{ref}$ in Step 204. Next, the value is reduced into the frequency signal in Step 206 and supplied to the modulation circuit in Step 208.

Figure 21:
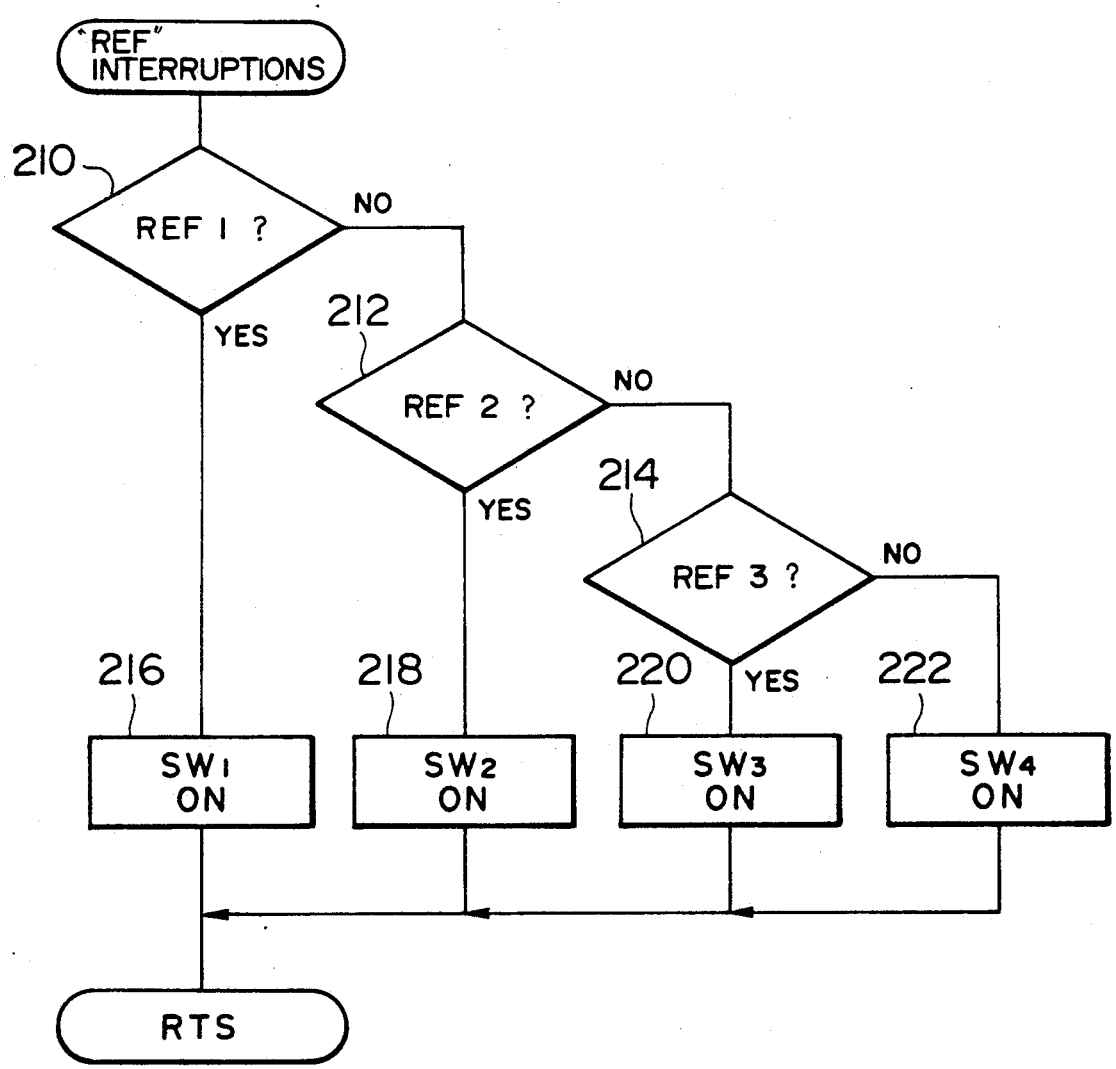

FIG. 21 shows a flow chart for switching or turning ON/OFF the switches SW1 to SW4 depicted in FIG. 14 by means of software. That is, the circuit depicted in FIG. 15 is carried out by means of software. The flow chart is carried out by "ref"-interruption. When the reference signal "ref" comes in, the pulse width of the signal is discriminated in Steps 210 through 214. When the reference signal "ref" has a value "ref"1, an ON signal is supplied to the switch SW1 corresponding to the cylinder No. 1 in Step 216. When the reference signal "ref" has a value "ref"2, an ON signal is supplied to the switch SW2 in Step 218. When the reference signal "ref" has a value "ref"3 or "ref"4, an ON signal is supplied to the switch SW3 or SW4 in Step 220 or 222. Because the current computer is high in its calculation speed, the operation can be realized by using the aforementioned method without using such a hardware circuit as shown in FIG. 15.

Figure 22:
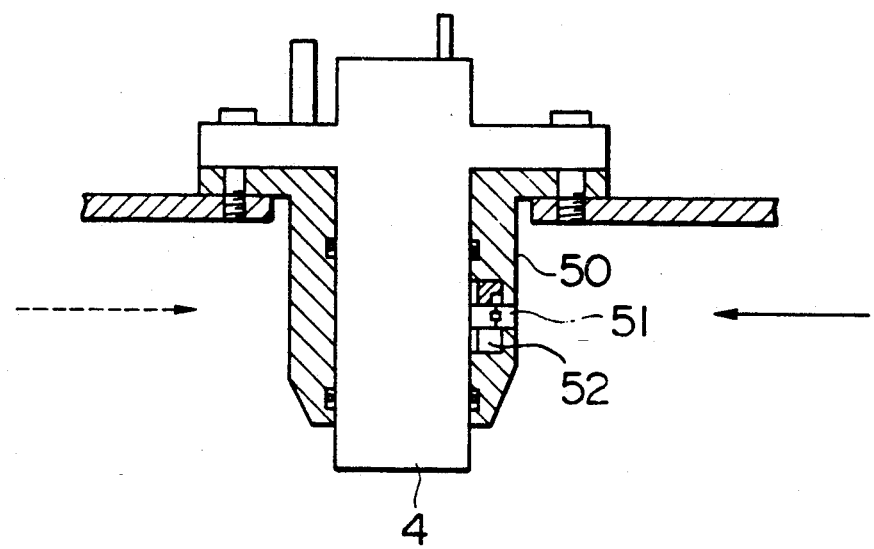
FIGS. 22 and 23 are views showing a further example of the configuration of the injection valve.
Figure 23:
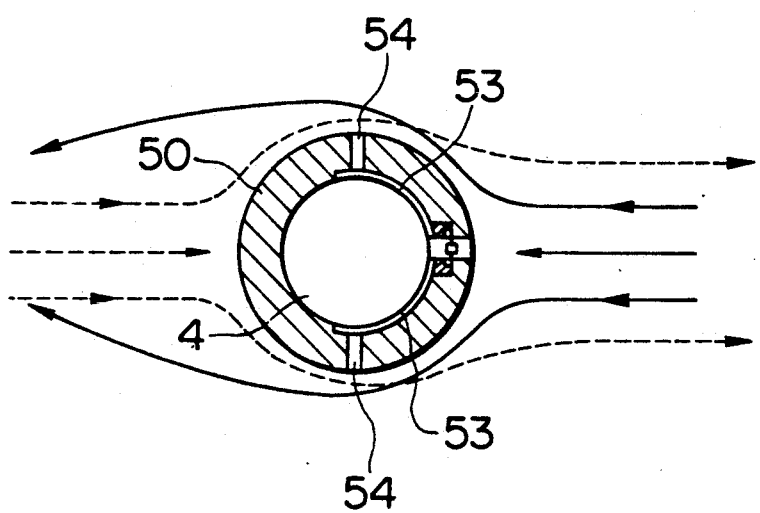

FIG. 22 shows a further example of the configuration of the injection valve in the case where another individual-cylinder air quantity sensor is used. In this example, a hot-wire air flow meter is used. As shown in FIG. 22, an outer cylinder 50 is provided in the outer circumference of the injection valve 4 and a passage 51 is provided in the outer cylinder 50 so that a hot wire 52 is arranged in the passage 51. The passage 51 is communicated with an outlet 54 through a slit 53 as shown in FIG. 23.

Assuming now that the air flow is a forward flow which is to be sucked into the engine as shown in the solid line, then dynamic pressure acts on the hot wire 52 so that the air flow can be measured. On the contrary, in the case where the air flow is a reverse flow which flows backward from the engine as shown in the broken line, the reverse flow cannot be detected by the hot wire 52 because the outlet 54 is located in a static pressure side with respect to the flow. By means of the thus configured individual-cylinder air flow sensor, the quantity of air sucked into the engine can be measured exactly. Also in this case, injection valves 4 and individual-cylinder air flow sensors are correspondingly provided for the respective cylinders.

Figure 24:
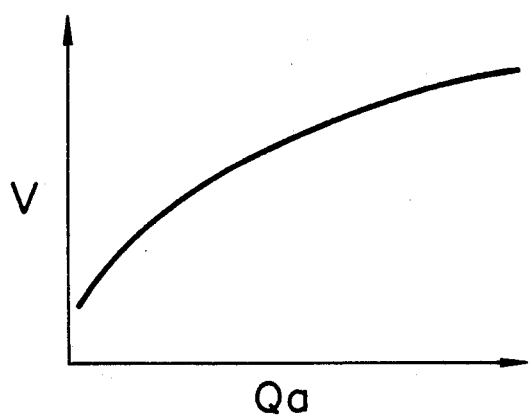
FIGS. 24 and 25 are characteristics graphs.
Figure 25:
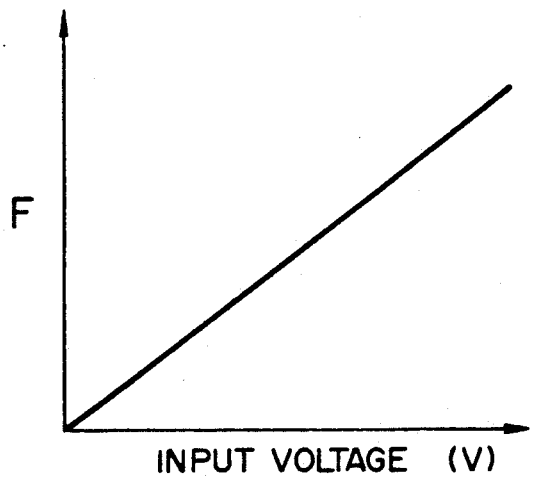
Figure 26:
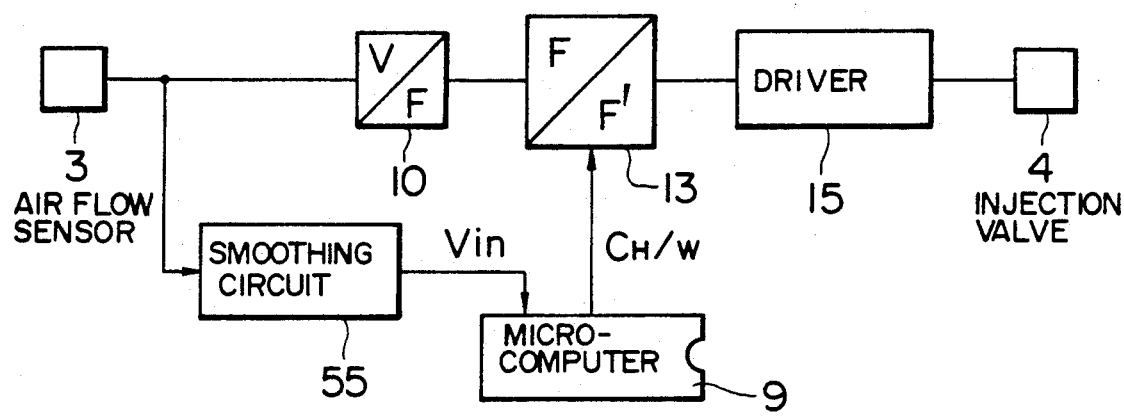
FIG. 26 is a view of another modulation circuit.
Figure 27:
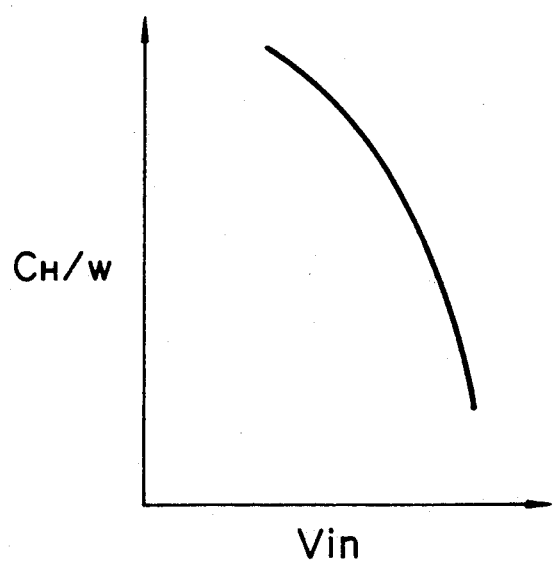
FIG. 27 is a characteristic graph.

In the hot wire air flow meter, the relationship between $Q_a$ and the output voltage V is nonlinear as shown in FIG. 24. In the V/F converter, however, the relationship between the input voltage and the output frequency F is linear as shown in FIG. 25. In this case, therefore, it is necessary that the characteristic as shown in FIG. 24 is stored in advance in the microcomputer so as to make correction at the time of determination of the fuel quantity. FIG. 26 is a circuit block diagram showing an example of the method of correction. The signal from the individual-cylinder air flow sensor 3 is subjected to V/F conversion in the frequency conversion circuit 10, and, at the same time, is smoothened by a smoothing circuit 55. The resulting signal is supplied into the microcomputer 9 in the form of an input signal $V_{in}$. A reference value $C_{H/W}$ for modulation as shown in the diagram of FIG. 18B is supplied from the microcomputer 9 to the modulation circuit 13 so that correction is carried out on the hot-wire (H/W) output. The relationship between $V_{in}$ and $C_{H/W}$ is shown in FIG. 27. The characteristic in FIG. 27 is found from the characteristic in FIG. 24. By using the aforementioned method, any type sensor exhibiting a nonlinear output value can be used. Other operations are similar to those in the case where the aforementioned pressure sensor is used.

Although FIG. 14 shows the case where the circuits 10, 13 and 15 are used commonly by time-division through the switches SW1 to SW4 for the purpose of cost saving, the present invention can be applied to the case where those circuits 10, 13 and 15 are provided for every cylinder. In the case where the engine is a six-cylinder engine or an eight-cylinder engine, the circuits 10, 13 and 15 are provided for every cylinder, or two or three combinations of the circuits 10, 13 and 15 are provided because the air-intake strokes for the respective engines are overlapped with each other.

In the following, a method for determining the fuel quantity corresponding to the operation of the intake valve 7 as shown in FIG. 1 will be described as a further embodiment of the present invention.

Figure 28:
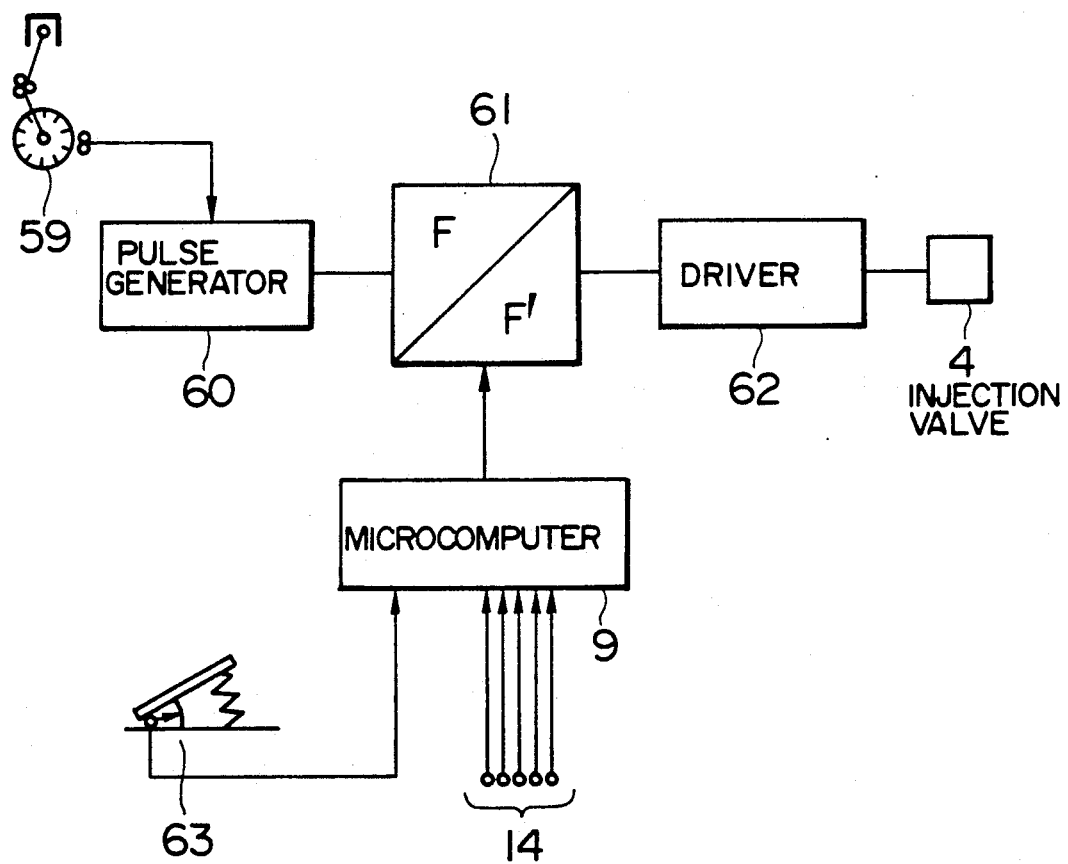
FIG. 28 is a schematic diagram showing the whole configuration of another embodiment of the present invention.
Figure 29:
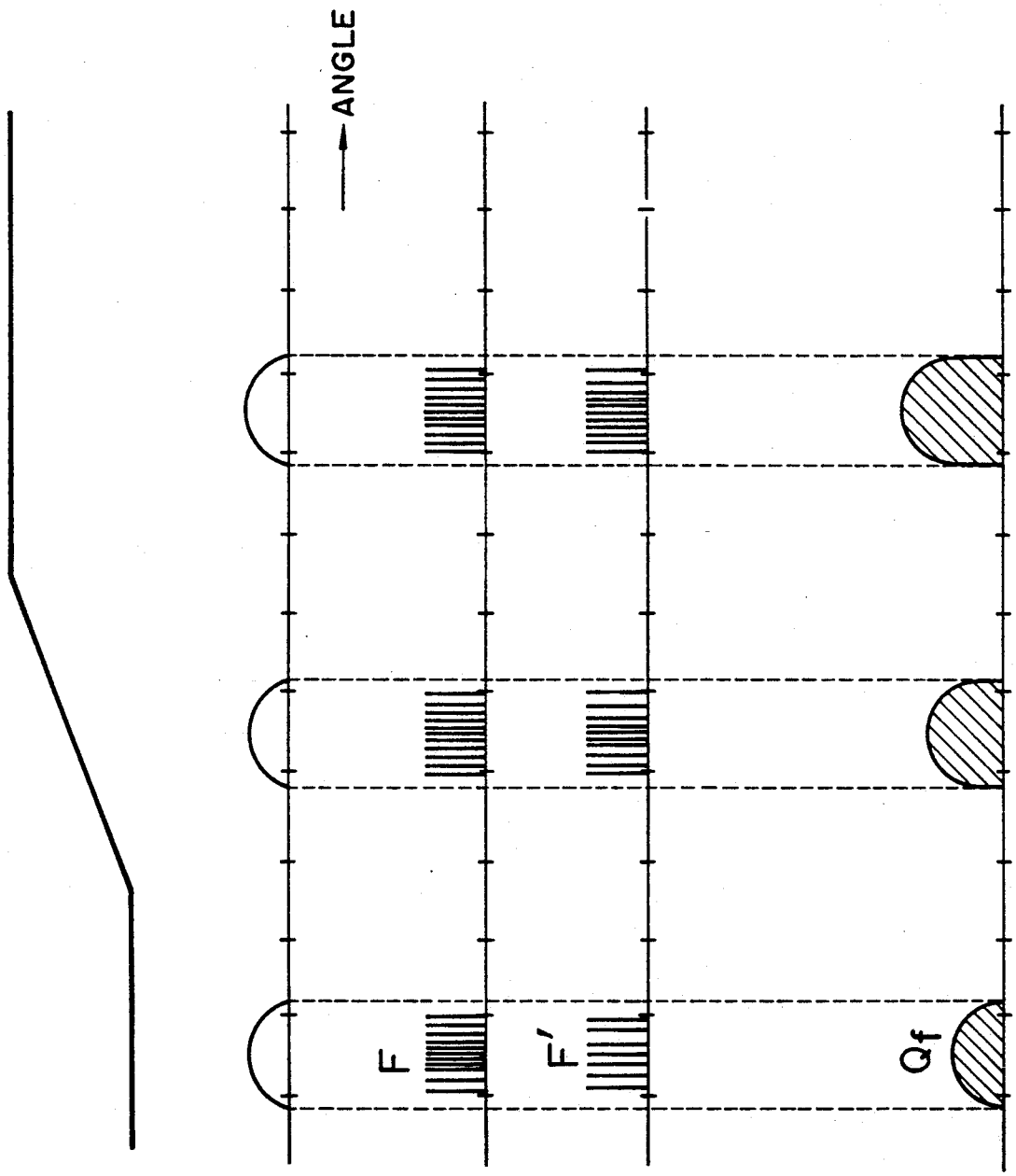
FIGS. 29A through 29E are views showing characteristics at the time of acceleration.

In FIG. 28, a pulse signal having a frequency corresponding to the quantity of displacement (quantity of lifting) of the intake valve is generated from a pulse generator 60 in the timing in which the intake valve is opened based on the signal of a crank angle sensor 59. The pulse generation can be programmed in advance in the pulse generation circuit 60. In short, this method is based on the thought that the air quantity at the inlet of the cylinder is proportional to the quantity of displacement of the intake valve. In the case where the engine speed is constant, the frequency signal does not change because the operation of the intake valve does not change though the load changes. Therefore, the frequency signal must be changed suitably corresponding to the load. For this purpose, a load signal is obtained by an accelerator opening sensor 63. When the accelerator opening is large, the frequency is established to be large through the modulation circuit 61. When the accelerator opening is small, the frequency is established to be small. Modulation based on various correction parameters 14 is carried out in the same manner as described above. The reference numeral 9 designates a microcomputer. According to the aforementioned method, there is no necessity of providing the individual-cylinder air flow sensor 3 for every cylinder. FIG. 29 shows the operation in the case where the accelerator opening is changed. In FIG. 29, the diagram of FIG. 29A shows the accelerator opening, the diagram of FIG. 29B shows the quantity of lifting of the intake valve, and the diagram of FIG. 29C shows the output value of the pulse generation circuit 60 which generates a frequency F corresponding to the quantity of lifting of the intake valve. The frequency F does not change though the accelerator opening changes, while the frequency changes with respect to the crank angle. The frequency F shown in the diagram of FIG. 29C is modulated based on the accelerator opening. The diagram of FIG. 29D shows the frequency signal F' thus modulated. When the accelerator opening is small, the frequency F' is modulated to a small value. When, on the contrary, the accelerator opening is large, the frequency F' takes a large value. When the signal as shown in the diagram of FIG. 29D is supplied to the drive circuit 62 as shown in FIG. 28, the quantity $Q_f$ of fuel injected from the injection valve 4 changes as shown in the diagram of FIG. 29E. In this embodiment, $Q_f$ increases as the accelerator opening increases. Further, $Q_f$ changes proportionally to the quantity of lifting of the intake valve which is open. According to the aforementioned method, the same effect can be attained.

Figure 30:
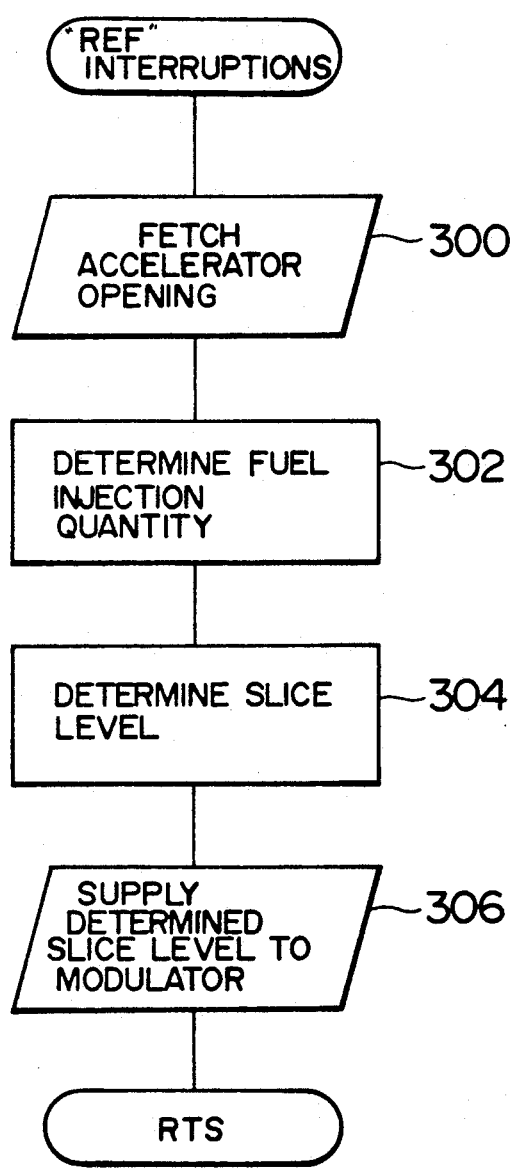
FIG. 30 is a flow chart.

FIG. 30 is a flow chart of the microcomputer 9. The flow chart is provided to modulate the frequency F based on the accelerator opening. Because the flow chart must be carried out for every air-intake stroke, the flow chart is started by "ref"-interruption.

When the program is started, the accelerator opening is taken-in Step 300. The quantity of fuel to be injected corresponding to the taken-in accelerator opening is determined in Step 302. Then, a slice level such as for example $C_1$ or the like as shown in the diagram of FIG. 18B is determined in Step 304 and then supplied to the modulation circuit 62 in Step 306.

The method of correction based on various kinds of parameters 14 is carried out in the same manner as described above.

Although this embodiment has shown the case where the accelerator opening is used as a quantity exhibiting the load on the engine, the same effect can be attained in the case where the opening of a throttle valve is used as a quantity exhibiting the load.

FIG. 31 shows the operation in the case where the embodiment shown in FIG. 28 is simplified. In FIG. 31, a POS signal having a frequency corresponding to the crank angle as shown in the diagram of FIG. 31A is generated. When the intake valve is opened as shown in the diagram of FIG. 31B, a gate signal as shown in the diagram of FIG. 31C is generated. The POS signal is passed only when the gate is opened. The frequency signal is as shown in the diagram of FIG. 31D. The frequency signal F is modulated based on the accelerator opening to form a signal having a frequency F' as shown in the diagram of FIG. 31F. The fuel quantity $Q_f$ as shown in the diagram of FIG. 31E is supplied from the injection valve 4 based on the signal.

In this embodiment, the fuel quantity $Q_f$ does not change corresponding to the quantity of lifting of the intake valve. However, the mixture rate is kept substantially constant if the fuel quantity is averaged in the air-intake stroke.

FIG. 32 shows another method different from the method shown in FIG. 31. In FIG. 32, the POS signal shown in the diagram of FIG. 32A is subjected to frequency-dividing to form a signal having a frequency as shown in the diagram of FIG. 32B. Because the fuel quantity must be increased in the middle of the intake valve opening period as shown in the diagram of FIG. 32C, a gate signal corresponding to the middle of the period is produced as shown in the diagram of FIG. 32D. Another gate signal is produced in the other portion of the period. The signal having a high frequency as shown in the diagram of FIG. 32A is passed based on the gate signal as shown in the diagram of FIG. 32D, whereas the frequency-divided signal as shown in the diagram of FIG. 32B is passed based on the gate signal shown in the diagram of FIG. 32E. The resulting signal thus produced is shown in the diagram of FIG. 32F. The signal shown in the diagram of FIG. 32F is modulated based on the accelerator opening in the same manner as described above and then supplied to the drive circuit 62 to attain an injection pattern of the fuel quantity $Q_f$ which changes as shown in the diagram of FIG. 32G. According to the aforementioned method, the same effect as in FIG. 29 can be attained by a simple method.

Figure 33:
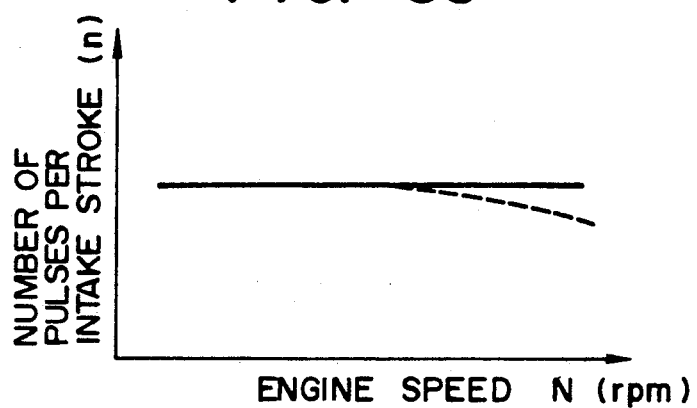
FIGS. 33 through 35 are characteristic graphs.
Figure 34:
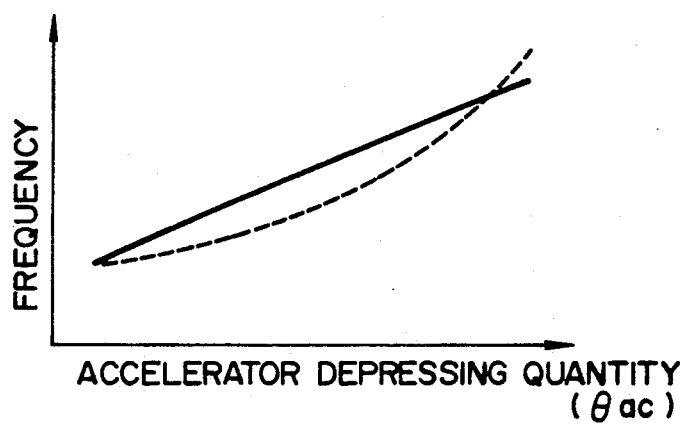
Figure 35:
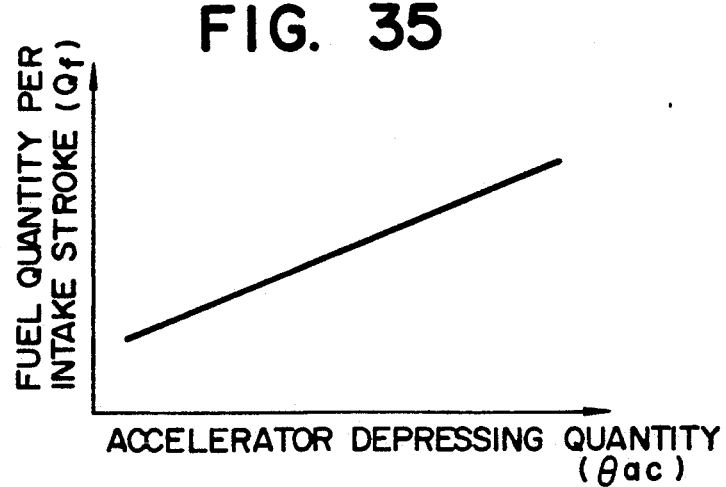

FIGS. 33 through 35 show the relationship between the pulse signal and the fuel quantity. The signals F respectively shown in the diagram of FIG. 29C, in the diagram of FIG. 31D and in the diagram of FIG. 32F are generated to have the same number n of pulses per air-intake stroke regardless of the engine speed as shown by a solid line in FIG. 33.

The frequency is modulated so that the frequency increases as the quantity $\theta_{ac}$ of depression of the accelerator increases, as shown in FIG. 34. When the modulation is carried out as described above, the fuel quantity per an air-intake stroke increases monotonically with respect to the quantity of depression of the accelerator as shown in FIG. 35.

As another method, the number n of pulses may be determined so that n decreases as the engine speed N increases, as shown by the broken line in FIG. 33. This is a method to attain the characteristic under the consideration that the cylinder filling efficiency decreases as the engine speed N increases.

As a further method, the frequency may be established to be nonlinear with respect to the quantity $\theta_{ac}$ of depression of the accelerator as shown by the broken line in FIG. 34. This is a method in the case where the response sensitivity of a car against its accelerator is matched with the requirement of its driver.

Figure 36:
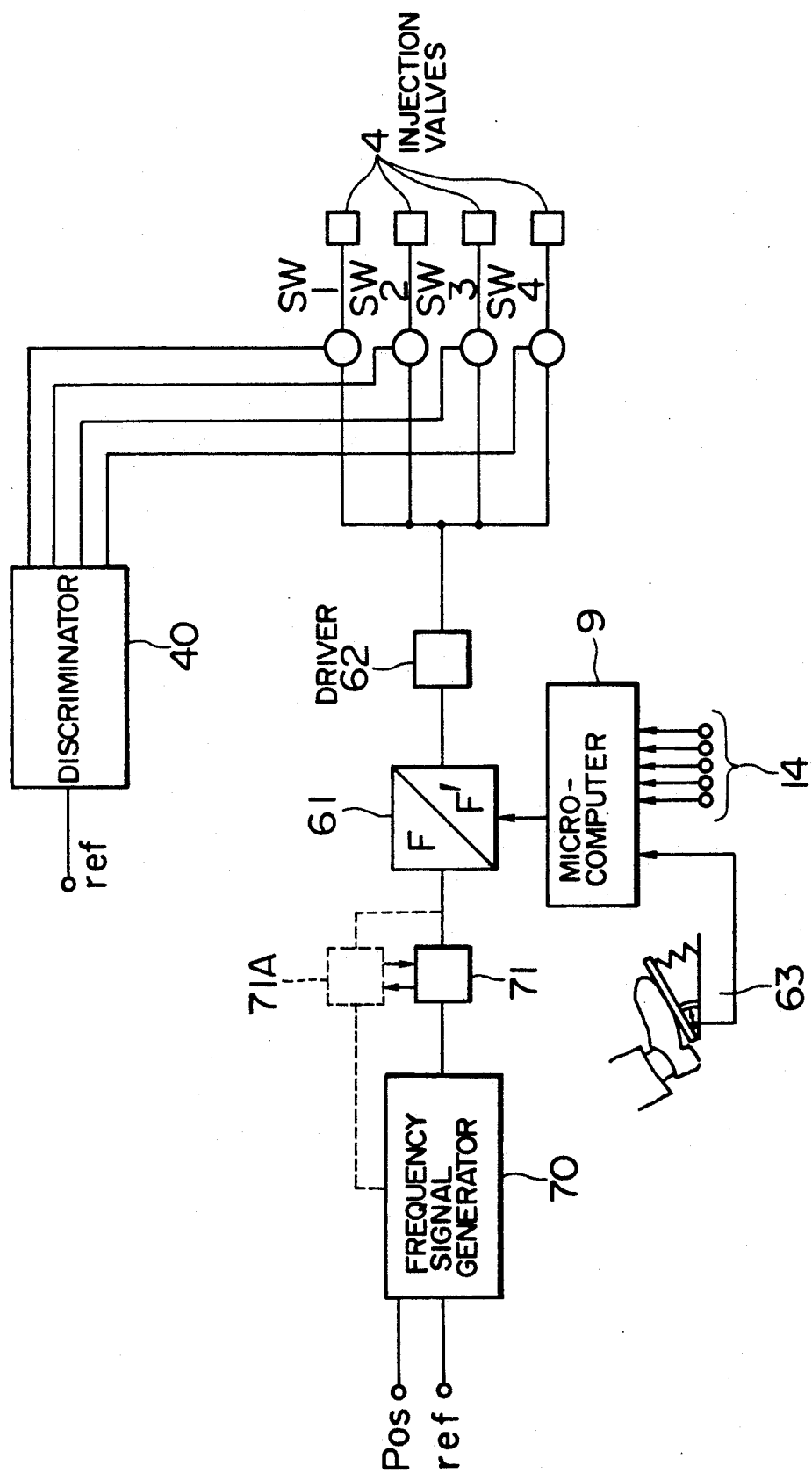
FIG. 36 is a diagram showing a specific example of the configuration of the modulation circuit depicted in FIG. 26.

FIG. 36 shows a specific ample of the configuration of the aforementioned method. In FIG. 36, the POS signal and the "ref" signal are supplied to a frequency signal generator 70 and then supplied to a modulation circuit 61 through a gate circuit 71. In this case, the frequency F is modulated to a frequency F' based on pushing-quantity correction parameters 14 obtained from an accelerator sensor 63 and then is given to a drive circuit 62. The switches SW1 to SW4 are turned ON successively based on the signal obtained from the cylinder discrimination circuit 40, so that intake valves 4 are driven successively. As another method, the frequency signal generator 70, the gate circuit 71, the modulation circuit 61 and the drive circuit 62 may be provided for every cylinder without using the switches SW.

In the case where the charts as shown in FIG. 32 are carried out, a gate circuit 71A is provided in addition to the gate circuit 71 as shown in FIG. 36. In this case, the gate circuit 71 serves to pass the signal having a frequency as shown in the diagram of FIG. 32B and the other gate circuit 71A serves to pass the signal having a frequency as shown in the diagram of FIG. 32A. The gate circuits are linked so that the gate circuit 71A, is opened when the gate circuit 71 is closed after being opened and then the gate circuit 71 is opened again when the gate circuit 71A is closed.

In the following, a method for supplying fuel corresponding to the operation of the intake valve at the time of air-intake of a cylinder based on the metering of the air quantity at an inlet of the cylinder through an air quantity sensor provided in a suction pipe collecting portion will be described as a further embodiment of the present invention.

Figure 37:
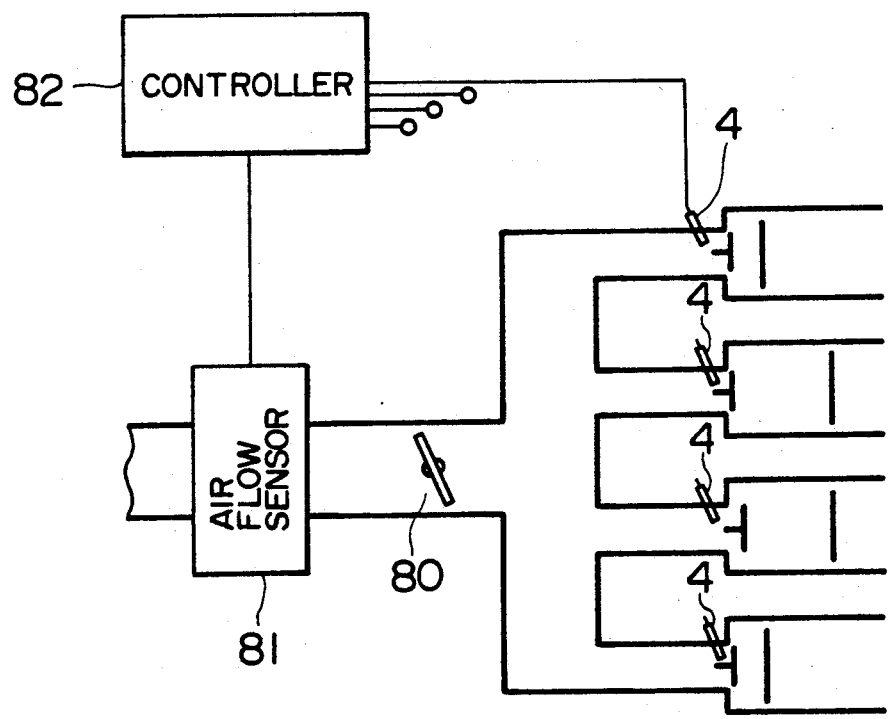
FIG. 37 is a schematic diagram showing the whole configuration of a further embodiment of the present invention.

FIG. 37 shows an example of the configuration of an injection systems provided with an air flow sensor 81 in a suction pipe collecting portion on the upstream side of a throttle valve 80. In FIG. 37, the air quantity sensor 81 is provided in the form of a hot wire sensor so that the output signal thereof is supplied to a control circuit 82. The control circuit 82 calculates the quantity of air at the inlet of the cylinder based on the detection output of the air flow sensor 81 so as to determine the fuel quantity corresponding to the suction air quantity, and supplies a fuel signal to the injection valve 4 of the corresponding cylinder.

Figure 38:
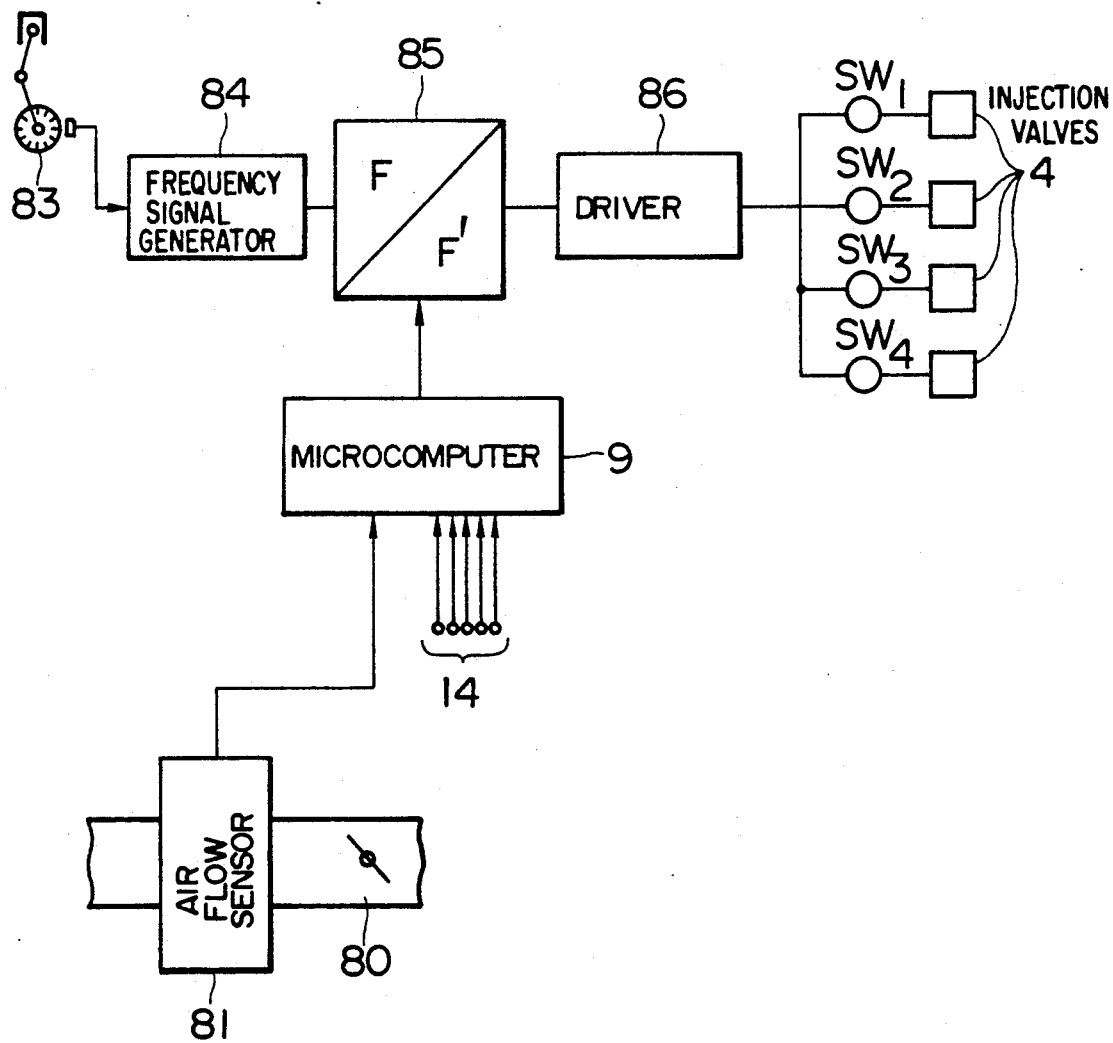
FIG. 38 is a diagram showing a specific example of the configuration of the apparatus depicted in FIG. 36.

FIG. 38 shows an example of the configuration of the control circuit 82. A frequency signal proportional to the quantity of lifting of the intake valve is produced by a frequency signal generator 84 based on the signal of a crank angle sensor 83. The frequency signal F is modulated to a frequency signal F' by a frequency modulation circuit 85 and then supplied to a drive circuit 86. Then, the signal is supplied to the injection valve 4 of corresponding one of the cylinders selected by the switches SW1 to SW4. The modulation in the frequency modulation circuit 85 is carried out by the microcomputer based on the signal obtained from the air flow sensor 81 while using the correction values 14. In short, means for detecting the quantity of depression of the accelerator in FIG. 28 is replaced by the air quantity sensor 81 provided in the suction pipe collecting portion.

FIG. 39 shows the operation in this embodiment. In FIG. 39, the diagram of FIG. 39A shows the change of the quantity of depression of the accelerator pedal. The diagram of FIG. 39B shows the change of the suction air quantity with the change of the quantity of depression of the accelerator. In the diagram of FIG. 39B, the solid line shows the true quantity of air sucked into the cylinder, and the broken line shows the output of the air flow sensor 81. The output of the air flow sensor 81 has a characteristic so that the phase of the output is ahead compared with the phase of the true suction air quantity because of repletion in the suction pipe in the downstream side of the throttle valve. Therefore, the output of the sensor is corrected to find the true suction air quantity in the next cycle. In short, the output value at the point of time represented by the symbol       is found from the output value at the point of time represented by the symbol ◯ in the diagram of FIG. 39B. The output value can be found by substituting the volume of the suction pipe, the engine speed N, the throttle valve opening and the like into a differential equation exhibiting the fluidal motion of air. As another method, the correction may be carried out by finding a correction value based on a map of parameters as described above. In any case, the suction air quantity at the inlet of the cylinder in the next stroke with respect to the point of time of detection by the sensor can be found. The suction air quantity at the point of time represented by the symbol       is found at the point of time represented by the symbol ◯ in the diagram of FIG. 39B, so that the fuel quantity $Q_{fo}$ proportional to the suction air quantity is determined. Fuel of the thus determined quantity $Q_{fo}$ is supplied in the next stroke. The diagram of FIG. 39C shows the quantity of lifting of the intake valve. A frequency signal F corresponding to the lifting quantity shown in the diagram of FIG. 39C is generated in the frequency signal generator 84 as shown in the diagram of FIG. 39D. Then, the signal is modulated to a frequency signal F' based on the found value $Q_{fo}$ as shown in the diagram of FIG. 39E, so that fuel $Q_f$ is supplied from the injection valve 4 through the drive circuit 86.

Although this embodiment has shown the case where injection valves each using an electrostrictor to change the flow rate based on the frequency signal are used as fuel supply units, a further embodiment using injection valves based on another theory will be described hereunder.

Figure 40:
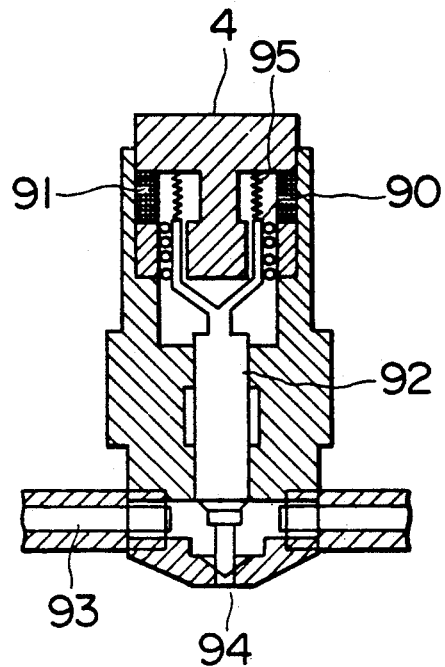
FIGS. 40 and 43 are views showing examples of the configuration of the injection valve.

The injection valve 4 as shown in FIG. 40 is of the type in which the flow rate changes corresponding to the duty ratio. To attain a high-speed operation, a voice coil 90 is used. When the coil 90 is excited, a needle 92 ascends based on the operation of the coil 90 and a magnet 91, so that fuel supplied from a passage 93 is injected through an injection hole 94. When the excitation is eliminated, the needle descends based on the operation of a spring 95 so that the injection is stopped.

Figure 41A:
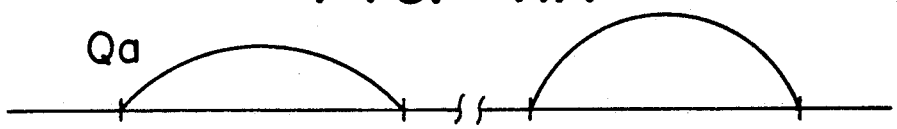
FIGS. 41A, 41B and 41C are time charts.
Figure 41B:
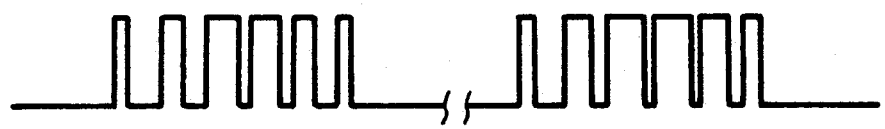
Figure 41C:
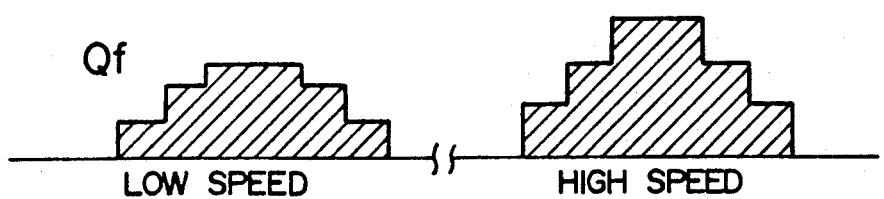

FIG. 41 shows the relationship between the duty signal and the fuel quantity $Q_f$. In FIG. 41, in the case of low-speed driving, the duty ratio corresponding to the detection value of the suction air quantity as shown in the diagram of FIG. 41A is determined based on the detection value. The thus obtained duty signal is shown in the diagram of FIG. 41B. Fuel of the quantity proportional to this duty signal is injected from the injection valve. This condition is shown in the diagram of FIG. 41C. Although the drawings have shown the case where one air-intake stroke is divided into six equal parts, the number of divisions can be increased to approach the change of the fuel quantity $Q_f$ to the change of the air quantity $Q_a$ if the response characteristic of the injection valve permits it.

In the case of high-speed driving, the suction air quantity $Q_a$ increases. Accordingly, the duty ratio increases, so that the fuel quantity increases.

Figure 42:
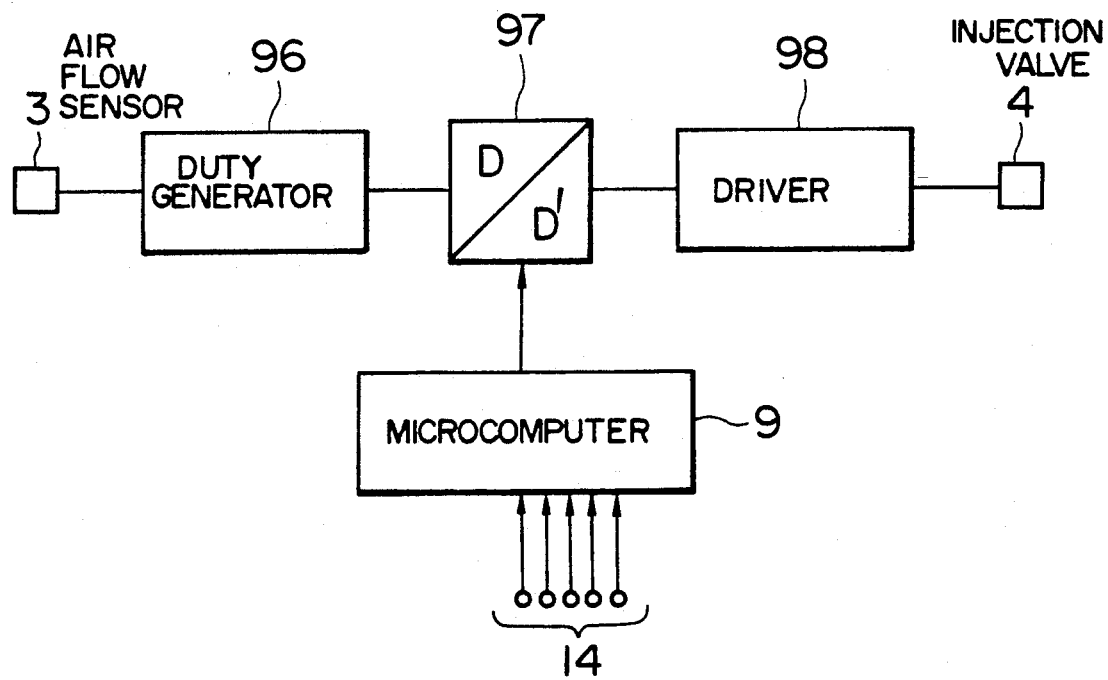
FIGS. 42 and 44 are block diagrams of the injection valve control circuits.

FIG. 42 is a block diagram of a circuit for carrying out the aforementioned operation. The output from the air quantity sensor 3 is converted into a duty signal D by a duty generation circuit 96. With correction parameters 14, the duty signal D is converted further into a duty signal D' which is supplied to a drive circuit 98. The drive circuit 98, actuates the injection valve 4 to supply the fuel in a quantity proportional to the duty signal D'.

Figure 43:
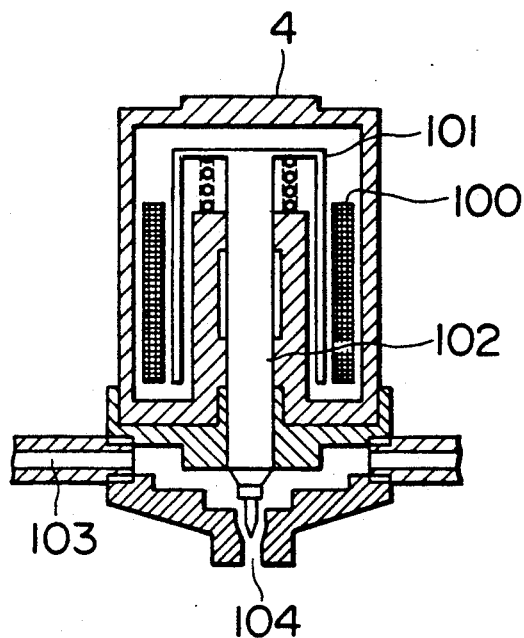

FIG. 43 shows a further example of the configuration of the injection valve 4. This is a so-called proportional control valve in which an armature 101 moves vertically in proportion to the quantity of electricity when the analog quantity of electricity is applied to a coil 100. As a result, a needle 102 moves vertically in an analog manner, so that the effective sectional area of an orifice 104 changes in an analog manner. As a result, fuel supplied from a passage 103 is injected through the orifice 104.

Figure 44:
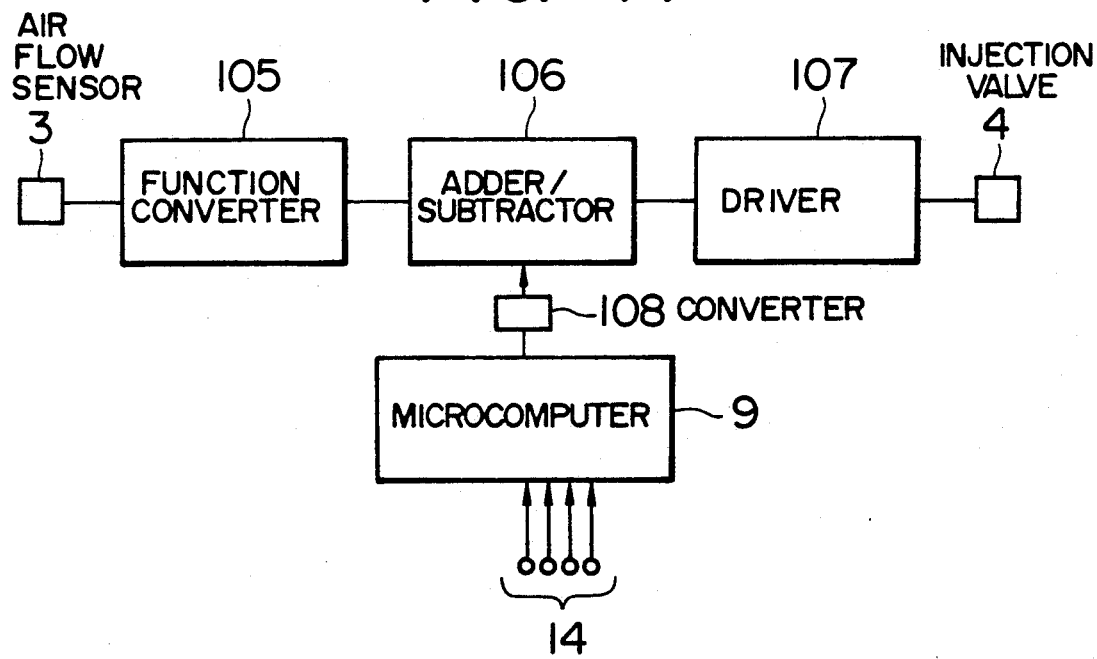

FIG. 44 is a block diagram of a control circuit using the injection valve depicted in FIG. 43. The output value of the air flow sensor 3 is functionally converted into a suitable analog value by a function converter 105. The signal of the microcomputer 9 is D/A converted by a circuit 108 and then corrected by an adder-subtracter circuit 106. Then, fuel of the quantity corresponding to the detection value of the sensor 3 is supplied from the injection valve through a drive circuit 107.

The control circuit except the sensor 3 and the injection valve 4 in FIGS. 42 and 44 may be replaced by the frequency conversion circuit 10, the frequency conversion circuit 13 and the drive circuit 15 depicted in FIG. 14.

Figure 45:
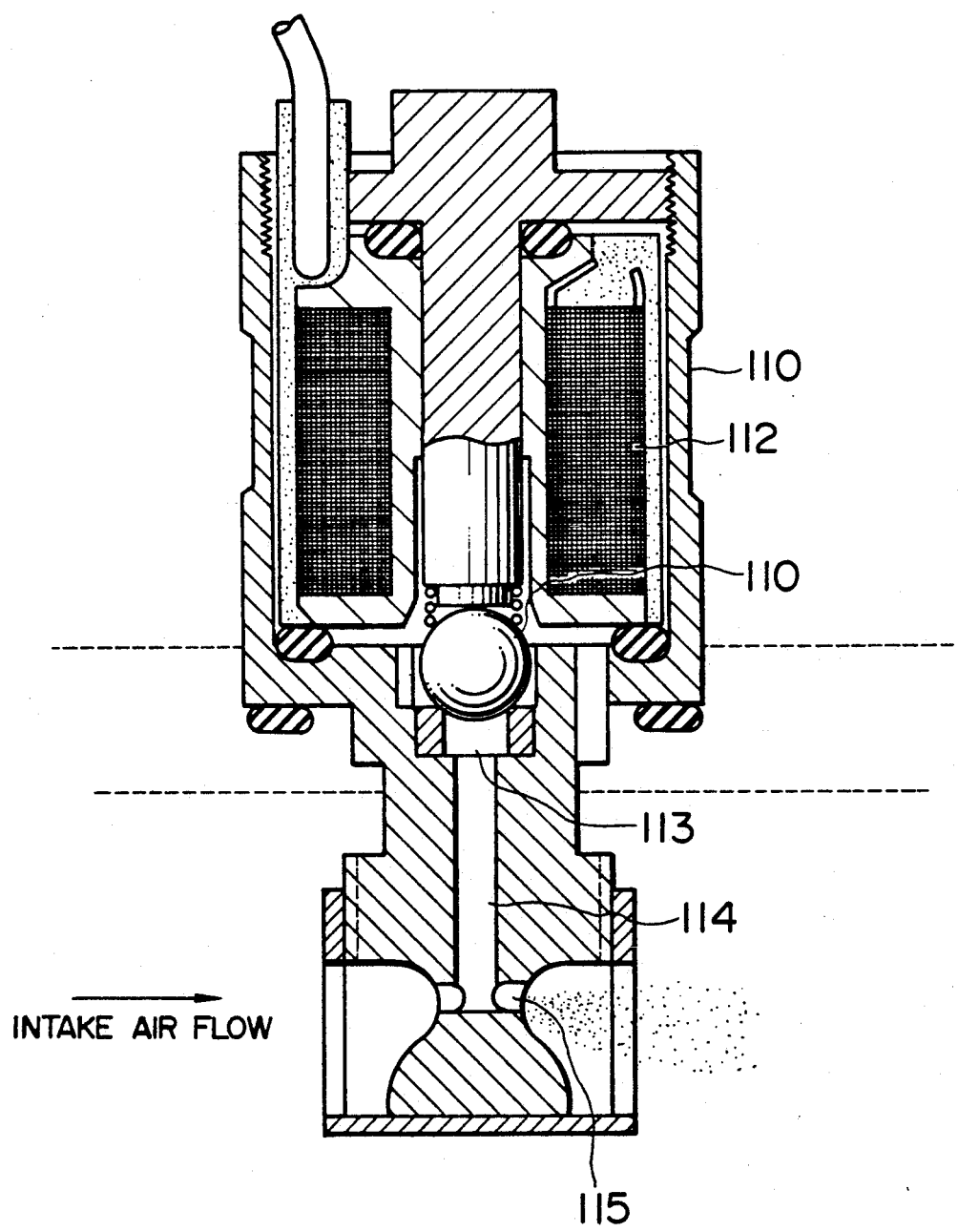
FIGS. 45 and 48 are views showing examples of the configuration of the injection valve.

FIG. 45 shows an example of the configuration of the injection valve, particularly, suitable for the embodiment in FIG. 37.

An injection valve 110 is an ordinary ON/OFF valve in which a ball valve 111 ascends to inject fuel out of an injection hole only during application of a voltage to a coil 112. The injected fuel is kept in a passage 114. When suction air is then produced in the direction of the arrow by opening the intake valve, fuel of the quantity proportional to the quantity of suction air passing through the orifice is injected. This is based on the theory of spraying constructed by the orifice 115 and the passage 114. Because the suction air quantity and the injected fuel quantity are proportional to each other, the mixture rate of the air-fuel mixture thus formed is kept substantially constant. In this example, fuel must be supplied into the passage before air intake. Accordingly, this example is suitable for the embodiment depicted in FIG. 37.

Figure 39A:
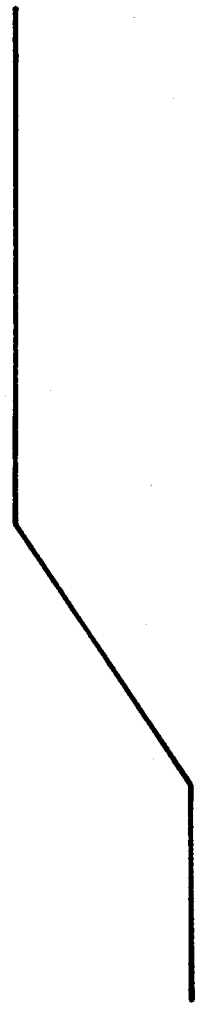
FIGS. 39A through 39F are view showing characteristics at the time of acceleration.
Figure 39B:
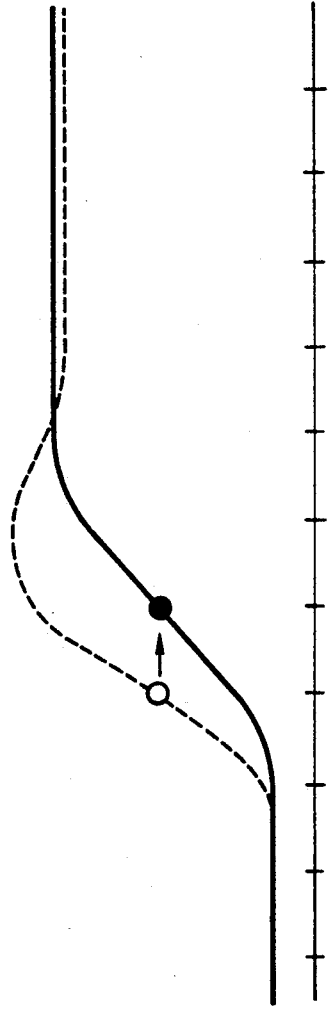
Figure 39C:
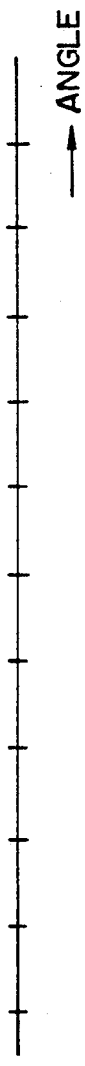
Figure 39D:
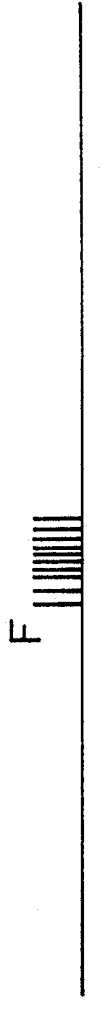
Figure 39E:
Figure 39F:
Figure 46A:
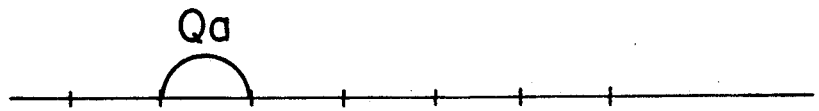
FIGS. 46A, 46B and 46C and 49A, 49B and 49C are time charts.
Figure 46B:
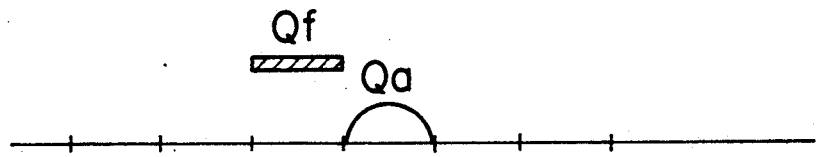
Figure 46C:
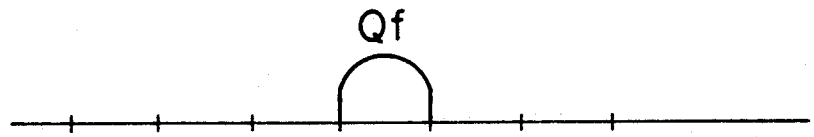

FIG. 46 shows the relationship between the air quantity $Q_a$ and the fuel quantity $Q_f$ in the case where the injection valve depicted in FIG. 45 is used. As shown in the diagrams of FIGS. 39A and 39F, the air quantity $Q_a$ in the next cycle is found as shown in the diagram of FIG. 39B by detecting the air quantity $Q_a'$ as shown in the diagram of FIG. 46A and correcting the quantity. The fuel quantity $Q_f$ is determined based on $Q_a$ and injected into the passage 114 as shown in the diagram of FIG. 39B. When the actual quantity $Q_a$ is then produced as shown in the diagram of FIG. 39C, the fuel quantity $Q_f$ is injected into the suction pipe as shown in the diagram of FIG. 39D based on the operation of the orifice 115. The fuel quantity $Q_f$ as shown in the diagram of FIG. 39D changes corresponding to the crank angle in the air-intake stroke.

Figure 47:
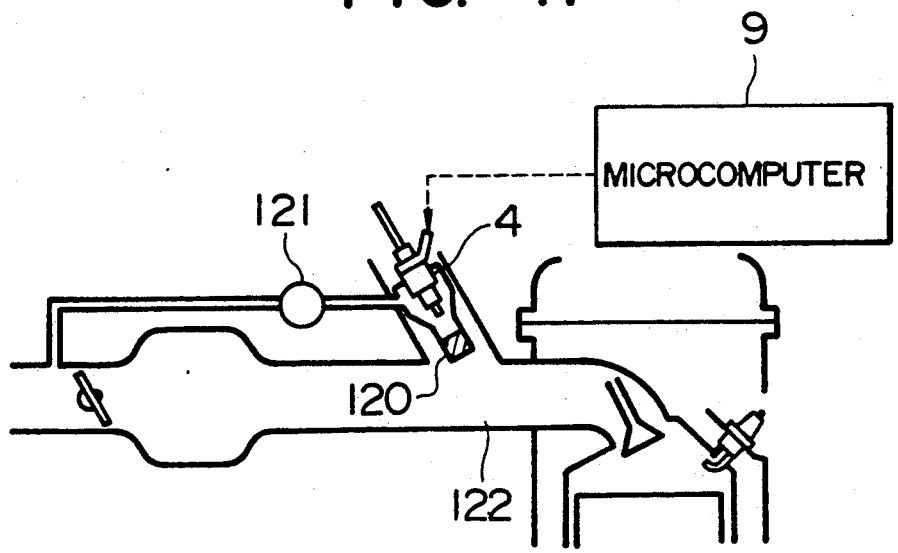
FIG. 47 is a diagram showing the configuration of a further embodiment of the present invention.

FIG. 47 shows a further example of the injection valve depicted in FIG. 45. The injection valve 4 is an ordinary ON/OFF valve in which fuel is injected according to an instruction of the microcomputer 9. The injected fuel is reserved in a fuel storage 120. Thereafter, an air electromagnetic valve 121 is opened in the air-intake stroke of a corresponding cylinder to supply air flow to the storage, so that the stored fuel is injected into an air-intake port 122. This carries out the operation as shown in the charts of FIG. 46.

Figure 48:
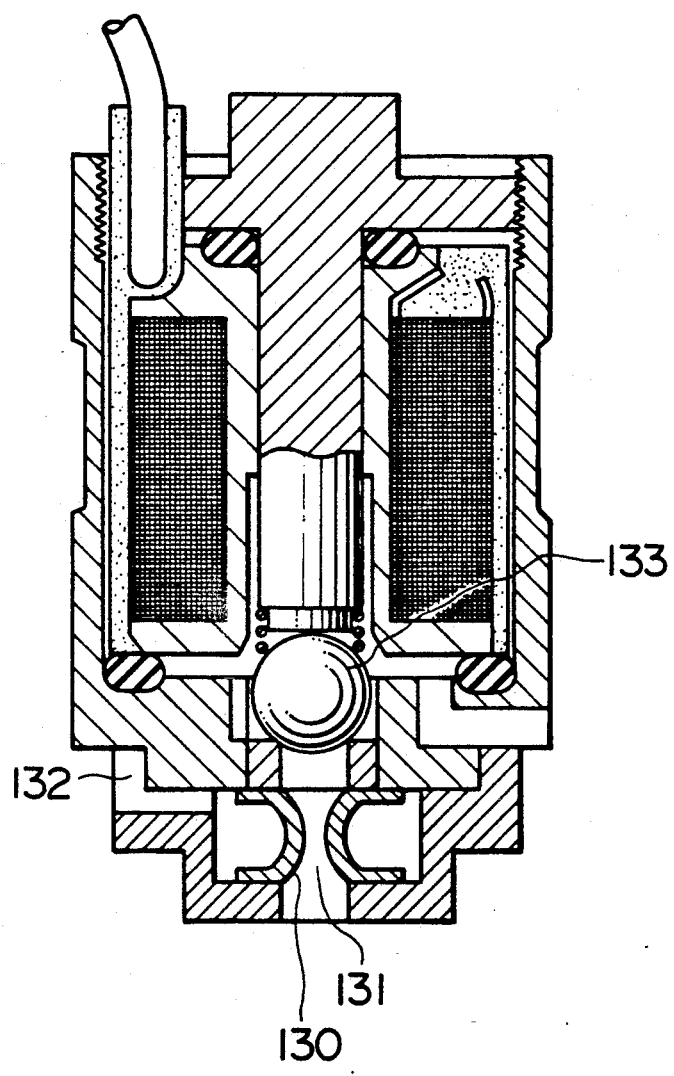

FIG. 48 shows a further example of the injection valve. In this example, the effective area of an injection slit 131 is changed by operating a diagram 130. This injection valve is suitable for the embodiment depicted in FIG. 37. The fuel quantity is determined in the preceding stroke, so that the diameter of the injection hole 131 is changed at the time of air suction to determine the quantity of fuel to be injected corresponding to the suction air quantity.

Figure 49A:
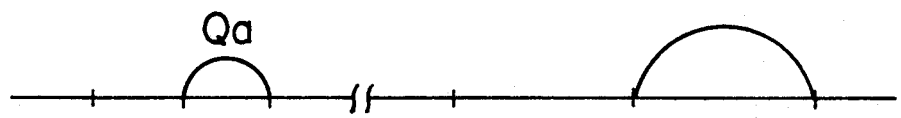
Figure 49B:
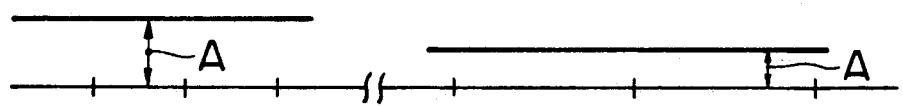
Figure 49C:
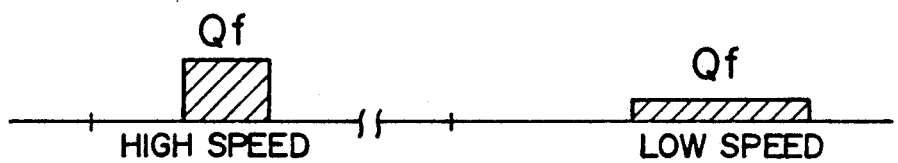
Figure 50A:
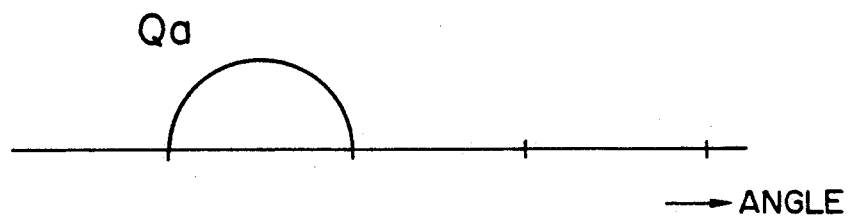
FIGS. 50A through 50D, 51A through 51D, and 52A through 52E are time charts.
Figure 50B:
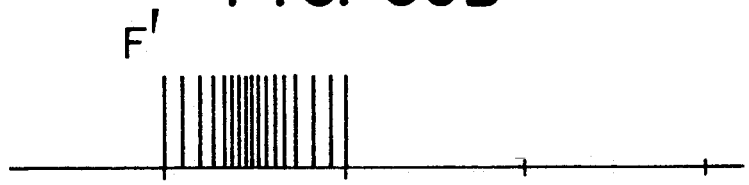
Figure 50C:
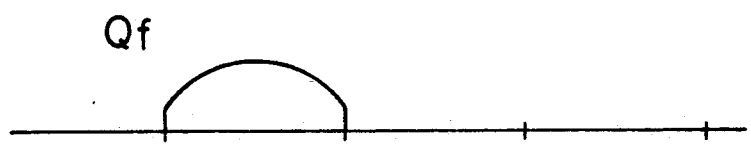
Figure 50D:
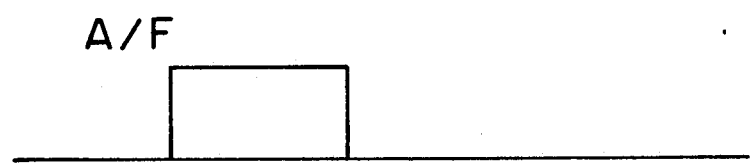

FIG. 49 shows the relationship between the air quantity $Q_a$ and the fuel quantity $Q_f$ in the case where the injection valve depicted in FIG. 48 is used. In the case where the engine speed N is so large that the period of one air-intake stroke is short, the effective sectional area A of the orifice 131 is enlarged as shown in the diagram of FIG. 49B. As a result, fuel can be injected during the period of the air-intake stroke. In the case where the engine speed is so small that a low speed is attained, the effective sectional area A is reduced as shown in the diagram of FIG. 49B so that fuel can be injected during the period. According to the aforementioned method, the air quantity $Q_a$ and the fuel quantity $Q_f$ can be approached to each other, though they do not perfectly correspond to each other. The operation of the diaphragm 130 is carried out by leading negative pressure from the passage 132. Because the operation of the diaphragm 130 can be carried out corresponding to the engine speed N, speedy operation is not required. Further, the metering of fuel is carried out based on the ball opening period of the ball valve 133.

FIG. 50 shows the relations between the air quantity $Q_a$, the fuel quantity $Q_f$, and the mixture rate A/F in the embodiment depicted in FIG. 1. In FIG. 50, when the air quantity $Q_a$ is produced as shown in the diagram of FIG. 50A, the air quantity $Q_a$ is detected by the air flow sensor 3. Then, the signal from the sensor is subjected to V/F conversion and modulated. The frequency signal F' thus modulated is obtained as shown in the diagram of FIG. 50B. The fuel quantity $Q_f$ corresponding to the frequency signal F' is supplied as shown in the diagram of FIG. 50C. Because the fuel quantity $Q_f$ and the air quantity $Q_a$ are proportional to each other, the air-fuel ratio A/F of the air-fuel mixture taken in the cylinder is kept substantially constant in the air-intake stroke as shown in the diagram of FIG. 50D. Accordingly, the cylinder can be filled with the air-fuel mixture having a uniform concentration in the view of space. This condition is suitable for stable combustion.

However, in a lean-burn engine operated in a lean limit in which the mixture ratio A/F is made larger, it is preferable to use a method in which combustion-enable A/F is given only to the vicinity of the ignition plug while a lean mixture ratio A/F is given to the other portions.

Figure 51A:
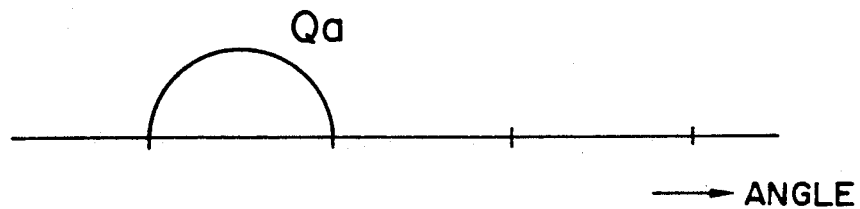
Figure 51B:
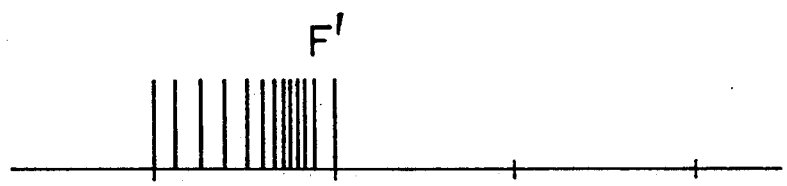
Figure 51C:
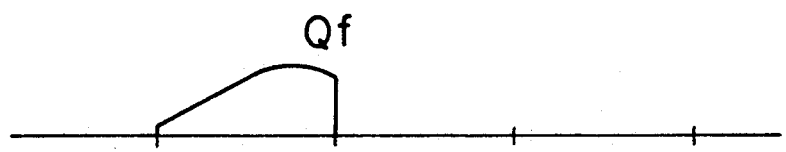
Figure 51D:
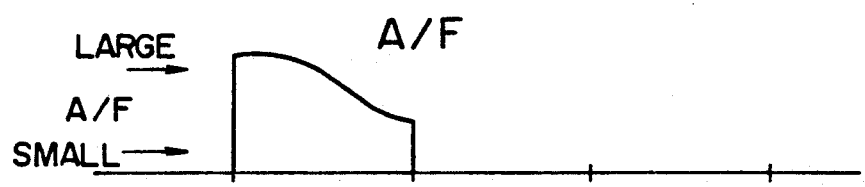
Figure 52A:
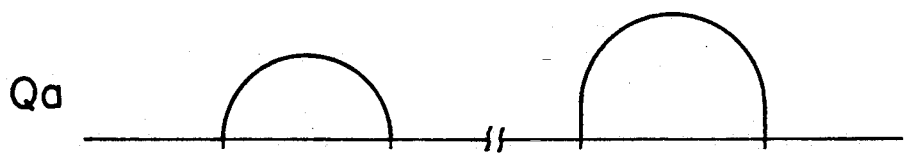
Figure 52B:
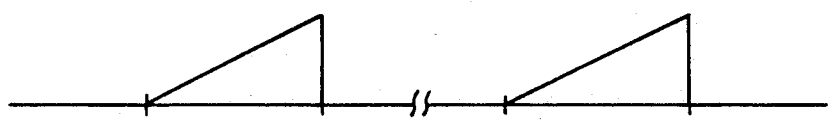
Figure 52C:
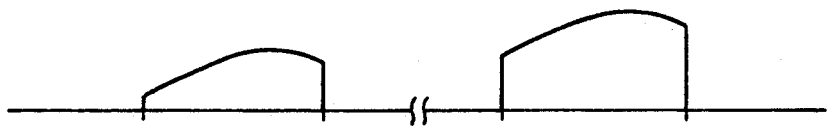
Figure 52D:
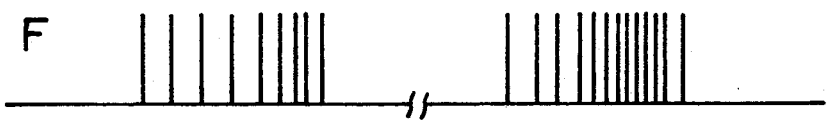
Figure 52E:
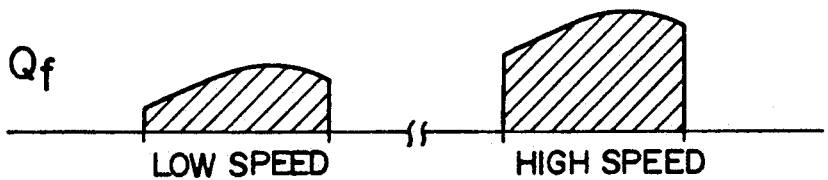

As shown in FIG. 51, therefore, a signal F' having a large frequency relative to the air quantity $Q_a$ as shown in the diagram of FIG. 51A is formed through conversion in the last stage of the air-intake stroke as shown in the diagram of FIG. 51B. The fuel quantity $Q_f$ is changed as shown in the diagram of FIG. 51C based on the frequency signal F' shown in the diagram of FIG. 51B. As a result, the mixture ratio A/F changes as shown in the diagram of FIG. 51D in the air-intake stroke based on the relation between the air quantity $Q_a$ as shown in the diagram of FIG. 51A and the fuel quantity $Q_f$ as shown in the diagram of FIG. 51C.

According to the aforementioned method, the concentration of the air-fuel mixture in the cylinder has the distribution that the concentration is high in the vicinity of the ignition plug and decreases toward the lower side. In short, a layer structure of the air-fuel mixture is attained so that lean-burn can be realized.

FIG. 52 shows an example to attain the method of FIG. 51. In FIG. 52, the air quantity $Q_a$ shown in the diagram of FIG. 52A is detected by the air flow sensor 3. The air quantity $Q_a$ is passed through a circuit to give weight to the air quantity $Q_a$ relative to the crank angle as shown in the diagram of FIG. 52B to therefore form a correction air signal as shown in the diagram of FIG. 52C. The signal shown in the diagram of FIG. 52C is small when $Q_a$ is small, while the signal is large when $Q_a$ is large. In short, the signal is proportional to the air quantity $Q_a$. Then, the correction air signal as shown in the diagram of FIG. 52C is subjected to V/F conversion to form a frequency signal F as shown in the diagram of FIG. 52D. The frequency signal F is corrected as described above, modulated to a frequency signal F' and then supplied to the drive circuit to thereby form the fuel quantity $Q_f$ which changes as shown in the diagram of FIG. 52E. The fuel quantity $Q_f$ decreases as the air quantity $Q_a$ decreases. On the contrary, the fuel quantity $Q_f$ increases as the air quantity $Q_a$ increases.

Figure 53:
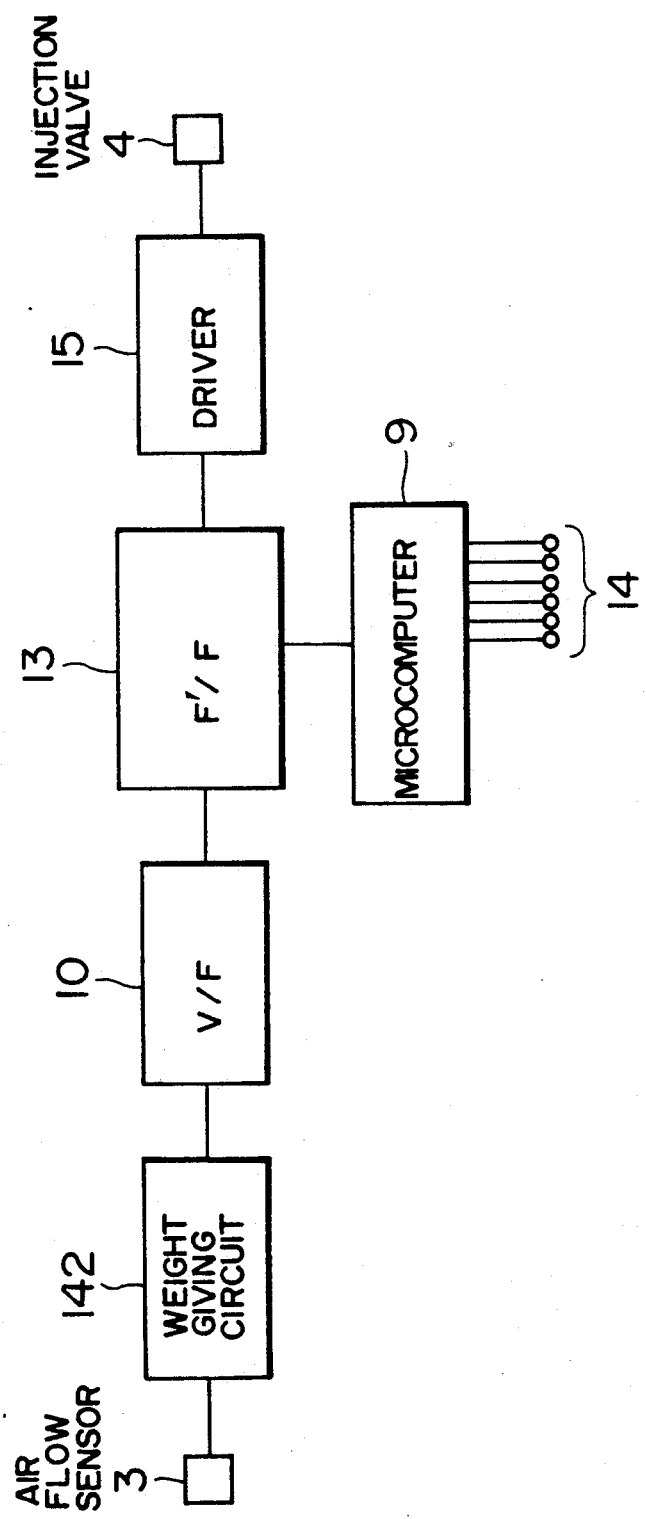
FIG. 53 is a diagram showing the configuration of a still further embodiment of the present invention.

FIG. 53 is a block diagram of a circuit for attaining the aforementioned control method. FIG. 53 is similar to FIG. 5 in the configuration of the air flow sensor 3, the V/F converter 10, the modulation circuit 13, the drive circuit 15 and the injection valve 4, except that a weight giving circuit 142 is additionally provided in FIG. 53. The weight giving circuit 142 is a circuit for giving weight to the output of the sensor 3 as shown in the diagram of FIG. 32B relative to the crank angle.

This circuit can be constituted simply by a sine wave generation circuit and a multiplier with respect to the crank angle.

According to the present invention, the concentration of the air-fuel mixture in each cylinder becomes so uniform that stable combustion in every cycle can be attained.

The mixture ratio in the cylinder takes a constant value at the time of acceleration in which the accelerator is depressed. Accordingly, the change of torque at the time of acceleration can be prevented. Consequently, there arises an effect that phenomena of breathing and surge do not occur.

We claim:

1. An air-fuel mixture supply apparatus for an internal combustion engine having a plurality of cylinders, comprising:
   a cylinder air quantity detection device for continuously detecting the quantity of air at an inlet to one cylinder throughout an air-intake stroke of the engine operation;
   control means for calculating, during the same air-intake and simultaneously with detection of the quantity of air throughout the air-intake stroke, a quantity of fuel proportional to the output of said cylinder air quantity detection device to thereby generate a fuel supply signal for supplying fuel of the calculated quantity said an air-intake stroke of said cylinder; and
   fuel injection means for injecting fuel during the entire air-intake stroke of said cylinder based on said fuel supply signal of said control means.

2. An air-fuel mixture supply apparatus for an internal combustion engine having a plurality of cylinders, comprising:
   a plurality of individual-cylinder air quantity detection devices for continuously detecting a respective quantity of air at an inlet to each of said cylinders throughout an air-intake stroke of the engine operation for each respective cylinder;
   control means for calculating, during the same air-intake for each respective cylinder and simultaneously with detection of the air quantity throughout the air-intake stroke, a respective quantity of fuel proportional to the output of each of said individual-cylinder air quantity detection devices to thereby generate a fuel supply signal for supplying fuel of the calculated quantity in an air-intake stroke of each of said cylinders; and
   fuel injection means for injecting fuel during the entire air-intake stroke of each of said cylinders based on said fuel supply signal of said control means.

3. An air-fuel mixture supply apparatus for an internal combustion engine having a plurality of cylinders, comprising:
   air-intake valve opening detection means for continuously measuring the opening degree of an air-intake valve of at least one cylinder throughout an air-intake stroke of the engine operation;
   control means for calculating a quantity of fuel proportional to the output of said air-intake valve opening detection means throughout the air-intake stroke to thereby generate a fuel supply signal for supply fuel of the calculated quantity in an opened state of said air-intake valve; and
   fuel injection means for injecting fuel based on said fuel supply signal of said control means.

4. An air-fuel mixture supply apparatus for an internal combustion engine comprising:
   cylinder air quantity detection means for continuously detecting the quantity of air at an inlet to at least one cylinder throughout an air-intake stroke of the engine operation;
   control means for continuously calculating a quantity of fuel proportional to the output of said cylinder air quantity detection means simultaneously with the detection of air quantity throughout said air-intake stroke to thereby generate a fuel supply signal for supplying in said air-intake stroke of said cylinder a calculated quantity of fuel which will provide an air-fuel ratio in said cylinder which is substantially constant over the air-intake stroke of the cylinder; and
   fuel injection means for injecting fuel in the air-intake stroke of said cylinder based on said fuel supply signal of said control means to thereby make the air-fuel ratio in said cylinder substantially constant.

5. An air-fuel mixture supply apparatus according to claim 3, further including an accelerator sensor for sensing the extent of actuation of an accelerator, and wherein said control means includes means for controlling the magnitude of said fuel supply signal on the bases of an output of said acceleration sensor.

6. An air-fuel mixture supply apparatus according to claim 3, wherein said fuel supply signal is a variable frequency signal.

7. In a fuel injection system for an internal combustion engine having a plurality of cylinders, a suction pipe with a throttle valve disposed therein for controlling the supply of intake air in said suction pipe, a plurality of intake ports each connecting said suction pipe to a respective cylinder to supply intake air to the cylinder, and a fuel injector for each cylinder, the improvement comprising:
   a plurality of air quantity detection devices each disposed in a respective one of said intake ports for individually detecting the quantity of air being supplied to respective cylinders, so that the quantity of fuel to be injected at each cylinder during each air intake stroke can be determined on the basis of the air quantity entering the cylinder during that same air intake stroke, wherein a fuel injector and an air quantity detection device are positioned adjacent each other in each intake port.

8. A fuel injection system according to claim 7, wherein air quantity detection device is provided on a flange portion of each of fuel injector.

9. An air-fuel mixture supply apparatus for an internal combustion engine having a plurality of cylinders, comprising:
   cylinder air quantity detection means for continuously detecting a quantity of air flow at an inlet to at least one cylinder at every moment simultaneously throughout an intake stroke period of an operating cycle of the internal combustion engine;
   control means for calculating a quantity of fuel in conformity with the detected quantity of air flow at every moment throughout the same intake stroke period of the same cycle during which said quantity of an air flow is detected to thereby generate a fuel supply signal corresponding to the quantity of fuel calculated throughout the same intake stroke period of the same operating cycle; and
   fuel injections means, responsive to said fuel supply signal, for injecting fuel for the cylinder throughout the same intake stroke period of the same operating cycle during which the quantity of air flow is detected.

10. An air-fuel mixture supply apparatus for an internal combustion engine according to claim 9, wherein said fuel injection means provided for each of said cylinders; and
said control means includes means for supplying respective drive signals to said fuel injection means so that fuel of a quantity proportional to the measured air quantity for each cylinder is injected into the measured air at each cylinder.

11. An air-fuel mixture supply apparatus according to claim 9, wherein said fuel injection means injects fuel a plurality of times throughout said intake stroke period.

12. An air-fuel mixture supply apparatus according to claim 11, wherein the frequency of fuel injection during each intake stroke period is proportional to the detected quantity of air flow during that intake stroke period.

* * * * *